(12) United States Patent
Hiramatsu et al.

(10) Patent No.: US 11,438,910 B2
(45) Date of Patent: Sep. 6, 2022

(54) TRANSMITTER AND TRANSMISSION METHOD

(71) Applicant: Panasonic Intellectual Property Management Co., Ltd., Osaka (JP)

(72) Inventors: Katsuhiko Hiramatsu, Osaka (JP); Takayuki Sotoyama, Kanagawa (JP); Shutai Okamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 58 days.

(21) Appl. No.: 16/629,284

(22) PCT Filed: Jun. 8, 2018

(86) PCT No.: PCT/JP2018/021978
§ 371 (c)(1),
(2) Date: Jan. 7, 2020

(87) PCT Pub. No.: WO2019/021648
PCT Pub. Date: Jan. 31, 2019

(65) Prior Publication Data
US 2020/0229203 A1 Jul. 16, 2020

(30) Foreign Application Priority Data
Jul. 24, 2017 (JP) .............................. JP2017-143000

(51) Int. Cl.
*H04B 7/185* (2006.01)
*H04W 72/12* (2009.01)
*H04W 72/04* (2009.01)

(52) U.S. Cl.
CPC ........ *H04W 72/12* (2013.01); *H04B 7/18513* (2013.01); *H04W 72/046* (2013.01)

(58) Field of Classification Search
CPC .. H04B 7/15507; H04B 7/185; H04B 7/0602; H04B 7/0617; H04B 7/0408;
(Continued)

(56) References Cited

U.S. PATENT DOCUMENTS 5,724,666 A * 3/1998 Dent ...................... H01Q 21/08
455/562.1
6,980,810 B1 * 12/2005 Gerakoulis ........... H04W 92/02
342/386
(Continued)

FOREIGN PATENT DOCUMENTS

JP 2012-511853 A 5/2012
JP 2014-161064 A 9/2014
(Continued)

OTHER PUBLICATIONS

International Search Report, dated Aug. 21, 2018, corresponding International Application No. PCT/JP2018/021978, 4 pages.

*Primary Examiner* — Shantell L Heiber
(74) *Attorney, Agent, or Firm* — Seed IP Law Group LLP

(57) ABSTRACT

A transmitter communicates with a receiver via a satellite station that transmits a signal by a multibeam system. The transmitter includes a scheduler and a transmission unit. The scheduler performs scheduling to determine a time and a wireless channel to transmit data addressed to the receiver based on an area where the receiver is present. The transmission unit transmits a signal of the data addressed to the receiver to the satellite station by the wireless channel determined by the scheduler and at the time determined by the scheduler. The signal transmitted from the transmission unit by an i-th (i is an integer of 1 or larger) wireless channel is transmitted from the satellite station to the receiver by an i-th beam. Frequencies of signals transmitted from the satellite station by respective beams are same.

11 Claims, 25 Drawing Sheets

(58) Field of Classification Search
CPC .. H04H 40/90; H04W 72/12; H04W 28/0231; H04W 76/10; H04W 72/04; H04W 16/10; H04W 16/14; H04L 1/0036
See application file for complete search history.

(56) References Cited

U.S. PATENT DOCUMENTS

| | | | |
|---|---|---|---|
| 9,621,468 B1* | 4/2017 | Sorenson, III | H04L 43/08 |
| 2010/0034146 A1 | 2/2010 | Hou et al. | |
| 2010/0035627 A1 | 2/2010 | Hou et al. | |
| 2010/0118851 A1* | 5/2010 | Kim | H04W 84/12 |
| | | | 370/338 |
| 2010/0173639 A1* | 7/2010 | Li | H04B 7/0639 |
| | | | 455/450 |
| 2011/0034192 A1* | 2/2011 | Lim | H04B 7/0417 |
| | | | 455/501 |
| 2012/0017247 A1* | 1/2012 | Hodson | H04H 20/42 |
| | | | 725/67 |
| 2016/0191201 A1* | 6/2016 | Park | H04B 7/0639 |
| | | | 370/252 |

FOREIGN PATENT DOCUMENTS

| | | |
|---|---|---|
| JP | 2017-005507 A | 1/2017 |
| JP | 2017-085244 A | 5/2017 |

\* cited by examiner

TRANSMITTER AND TRANSMISSION METHOD

This application is a U.S. national stage application of the PCT International Application No. PCT/JP2018/021978 filed on Jun. 8, 2018, which claims the benefit of foreign priority of Japanese patent application 2017-143000 filed on Jul. 24, 2017, the contents all of which are incorporated herein by reference.

TECHNICAL FIELD

The present disclosure relates to a transmitter and a transmission method.

BACKGROUND ART

In recent years, there has been an increasing demand for satellite communication according to enhanced image quality in television (TV) broadcasting and increasing use of broadband communication in an airplane and a ship. Consequently, development of a satellite communication system called a high throughput satellite (HTS) communication system has advanced (PTL 1). The high throughput satellite employs a multibeam system with increase in power received by a terminal by increase in a number of transmission beams and narrowing down of coverage areas. With the increase in power received by the terminal, a modulation, demodulation, and coding system with higher efficiency is available and thus throughput is improved.

In the multibeam system, each beam forms a conical beam pattern toward a proximity of ground. In order to fill an area near the ground with circular or substantially circular coverage areas corresponding the respective beams, an overlap region is formed between adjacent coverage areas. The overlap region is a region where a ratio of signal power of a desired beam to signal power of a proximity beam, that is, signal power of desired beam/signal power of proximity beam is between a first threshold (for example, −3 dB) and a second threshold (for example, 3 dB) (inclusive).

As interference suppression measures in the overlap region, four-frequency reuse and reuse of two frequencies, a vertical polarization, and a horizontal polarization have been conventionally employed.

CITATION LIST

Patent Literature

PTL 1: Unexamined Japanese Patent Publication No. 2017-5507

SUMMARY OF THE INVENTION

One aspect of the present disclosure provides a transmitter and a transmission method that are capable of suppressing interference in an overlap region and improving throughput of an overall system in a multibeam satellite communication system.

A transmitter according to one aspect of the present disclosure is a transmitter that communicates with a receiver via a satellite station that transmits a signal by a multibeam system. The transmitter includes a scheduler and a transmission unit. The scheduler performs scheduling to determine a time and a wireless channel to transmit data addressed to the receiver based on an area where the receiver is present. The transmission unit transmits a signal of the data addressed to the receiver to the satellite station by the wireless channel determined by the scheduler and at the time determined by the scheduler. The signal transmitted from the transmission unit by an i-th is an integer of 1 or larger) wireless channel is transmitted from the satellite station to the receiver by an i-th beam. Frequencies of signals transmitted from the satellite station by respective beams are same.

A transmission method according to one aspect of the present disclosure is a transmission method for a transmitter to transmit data via a satellite station that transmits a signal by a multibeam system to a receiver. Frequencies of signals transmitted from the satellite station by respective beams are same. The transmission method includes determining, by the transmitter, a time and a wireless channel to transmit data addressed to the receiver based on an area where the receiver is present. The transmission method also includes transmitting, by the transmitter, a signal of the data addressed to the receiver to the satellite station by the wireless channel determined and at the time determined. The transmission method also includes relaying, by the satellite station, the signal transmitted from the transmitter by an i-th (i is an integer of 1 or larger) wireless channel and transmitting, by the satellite station, the signal to the receiver by an i-th beam.

It should be noted that these general or specific aspects may be implemented by using a system, a device, a method, an integrated circuit, a computer program, or a recording medium, and may also be implemented by any combination of the system, the device, the method, the integrated circuit, the computer program, and the recording medium.

According to one aspect of the present disclosure, it is possible to suppress interference in an overlap region and improve throughput of an overall system in a multibeam satellite communication system.

Additional advantages and effects of one aspect of the present disclosure will become apparent from the description and drawings. The advantages and effects may be individually obtained by several exemplary embodiments and features of the description and drawings, which need not all be provided in order to obtain one or more of such advantages and effects.

DESCRIPTION OF EMBODIMENTS

Figure 1:
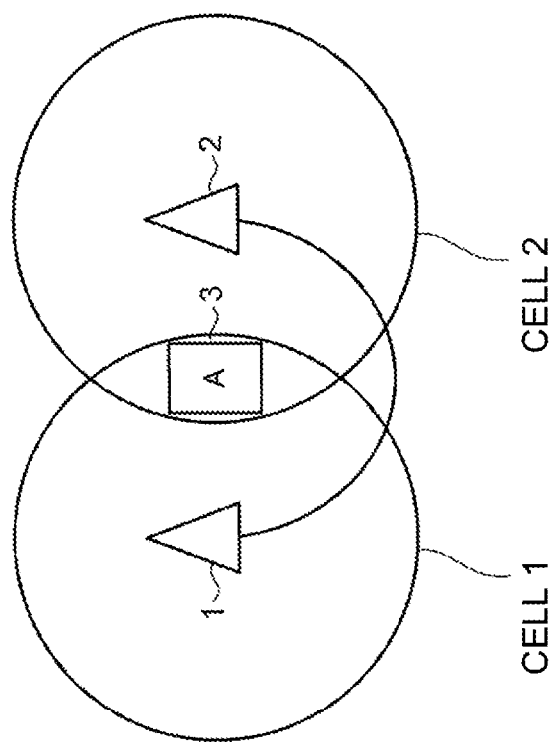
FIG. 1 is an explanatory view of a coordinated multipoint transmission system.

Prior to describing exemplary embodiments of the present disclosure, problems found in a conventional technique will briefly be described. In conventional interference suppression measures, different frequencies are used in adjacent beams. Consequently, a usage rate of resources decreases and throughput of an overall system decreases accordingly.

A method of suppressing interference at a cell boundary in ground mobile communication will be described first.

Inter-Cell Interference Suppression Technique in Ground Mobile Communication

Fractional frequency reuse has been conventionally known as an inter-cell interference suppression technique in ground mobile communication. Fractional frequency reuse is applied to a cell having an overlap part with other cells (cell boundary) like the overlap region in the multibeam system described above.

Near a base station in a cell, a distance between a terminal and the base station is short and attenuation of signals from the base station is small. The base station can thus communicate with the terminal with low power. On the other hand, at the cell boundary, the distance between the terminal and the base station is large and the attenuation of signals from the base station is large. The base station thus needs to communicate with the terminal with high power.

In fractional frequency reuse, transmission power is classified in two types in each cell, that is, low transmission power near the base station and high transmission power at the cell boundary. In addition, control is executed so as not to use high transmission power in adjacent cells at a same frequency and at a same time.

Inter-Cell Interference Suppression Technique in LTE

Enhanced inter-cell interference coordination (eICIC) has been conventionally known as an example of an inter-cell interference suppression technique in long-term evolution (LTE). In LTE, eICIC is used when a small cell is configured using the same frequency as a macro cell.

In a coverage of the macro cell, the small cell is disposed in, for example, a station and a downtown where a lot of users gather. A base station of the macro cell uses high transmission power. A base station of the small cell uses low transmission power.

In eICIC, the base station in the small cell transmits a protected resource that is important data and a non-protected resource that is unimportant data in time division. While the base station in the small cell transmits the protected resource, the base station in the macro cell stops transmitting a data section and transmits only a cell-specific reference signal (LTE-CRS) used for interference power measurement. On the other hand, while the base station in the small cell transmits the non-protected resource, the base station in the macro cell transmits the data section. Communication is thus performed with priority in the small cell disposed in the place where a lot of users gather and thus throughput per area is improved.

Next, a method of improving reception quality at a cell boundary in ground mobile communication will be described.

Coordinated Multipoint Transmission System in LTE

Conventionally, there has been known a coordinated multipoint transmission system in which a plurality of base stations perform coordinated transmission at a cell boundary to improve a signal-to-noise ratio (SN ratio) and achieve higher frequency usage efficiency.

Figure 2:
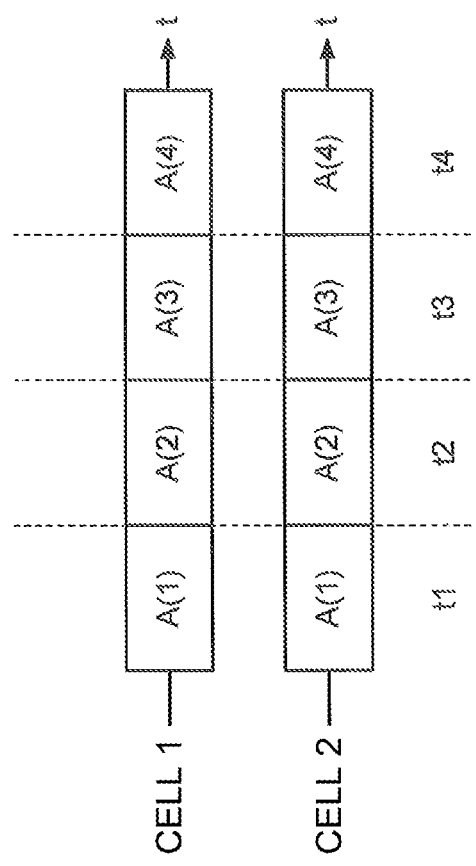
FIG. 2 illustrates an example of scheduling in the coordinated multipoint transmission system.

According to the coordinated multipoint transmission system, when terminal A (receiver 3) is present in an overlap region of cell 1 of base station 1 and cell 2 of base station 2 as illustrated in FIG. 1, each of base station 1 and base station 2 transmits, to terminal A, same data A(1), A(2), A(3), A(4) at times t1, t2, t3, t4, respectively, as illustrated in FIG. 2.

In this case, base station 1 and base station 2 are adjusted so as to synchronize a reference timing and cause a difference between an arrival time of data from base station 1 and an arrival time of data from base station 2 at terminal A to fall within a guard interval. As the data from base station 1 is combined with the data from base station 2 in terminal A, the S/N ratio is improved.

Figure 3:
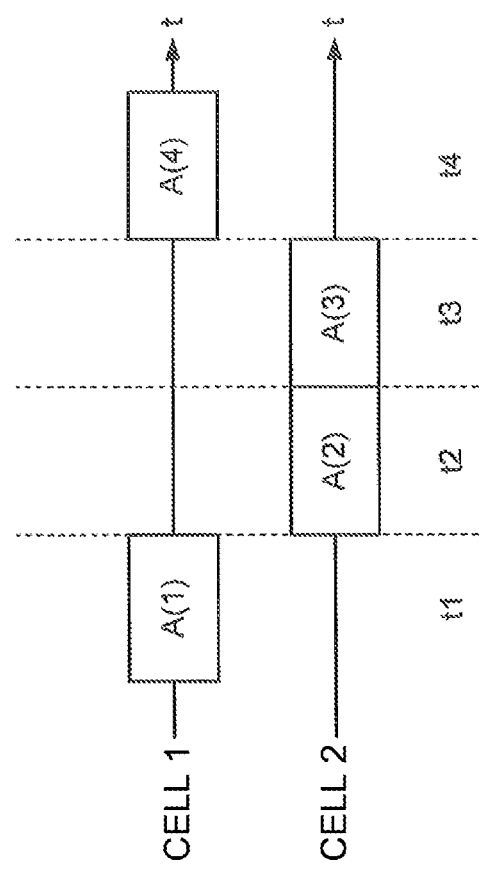
FIG. 3 illustrates another example of scheduling in the coordinated multipoint transmission system.

Alternatively, according to the coordinated multipoint transmission system, in a state of FIG. 1, data is transmitted only from a base station in which the S/N ratio in terminal A is high among base station 1 and base station 2. For example, it is assumed that the SN ratio of data from base station 1 is higher than the SN ratio of data from base station 2 at times t1, t4 and the SN ratio of the data from base station 2 is higher than the SN ratio of the data from base station 1 at times t2, t3. In this case, as illustrated in FIG. 3, base station 1 transmits data A(1) at time t1 and data A(4) at t4 to terminal A, whereas base station 2 transmits data A(2) at time t2 and data A(3) at t3 to terminal A.

In this case, base station 1 and base station 2 synchronize the reference timing. Terminal A can thus receive data from a base station in an optimum communication state.

Combination of Inter-Cell Interference Suppression Technique and Coordinated Multipoint Transmission System Next, a combination of the inter-cell interference suppression technique and the coordinated multipoint transmission system will be examined.

A combination of the fractional frequency reuse and the coordinated multipoint transmission system will be examined first. In the fractional frequency reuse, adjacent cells use different frequencies for high transmission power, so that inter-cell interference is suppressed. It is thus impossible to combine the coordinated multipoint transmission system in which adjacent cells use the same frequency with the fractional frequency reuse.

Figure 4:
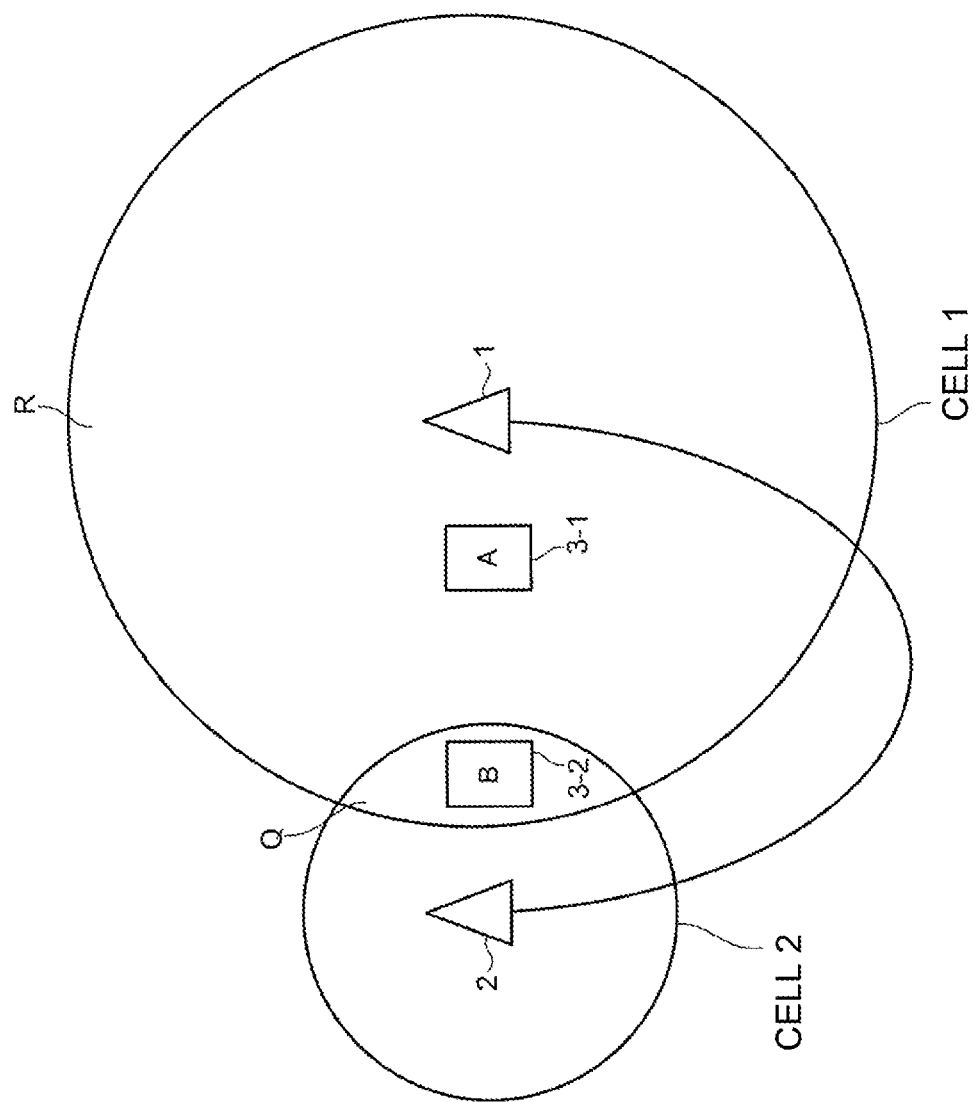
FIG. 4 is an explanatory view of a combination of enhanced inter-cell interference coordination (eICIC) and the coordinated multipoint transmission system.

Next, a combination of eICIC and the coordinated multipoint transmission system will be examined. FIG. 4 illustrates a case where terminal A (receiver 3-1) is present in area R of cell 1 of base station 1 that does not overlap cell 2 of base station 2 and terminal B (receiver 3-2) is present in overlap region Q of cell 1 and cell 2.

In eICIC, radio waves from a base station in a macro cell reach the macro cell, whereas both radio waves from the base station in the macro cell and radio waves from a base station in a microcell reach the microcell. In a case of FIG. 4, radio waves from base station 1 reach cell 1, and radio waves from base stations 1, 2 reach region Q of cell 2. The macro cell and the microcell in eICIC correspond to cell 1 and cell 2 illustrated in FIG. 4, respectively.

In eICIC, base station 2 in cell 2 (microcell) transmits a non-protected resource to terminal B and at the same time, base station 1 in cell 1 (macro cell) transmits data to terminal A at the same frequency. As interference occurs in terminal B, a modulation and demodulation system or an error-correcting code that is resistant to the interference must be used for data from base station 2, which reduces a transmission rate. As described above, if eICIC is combined with the coordinated multipoint transmission system, it is impossible to improve the SN ratio at the cell boundary.

As described above, it is impossible to use at the same time the interference suppression method at the cell boundary in a conventional frequency axis or time axis and the technique of improving the S/N ratio at the cell boundary by simultaneous or selective transmission from a plurality of base stations.

Differences in Communication Environments Between Ground Mobile Communication and Satellite Communication Next, differences in communication environments between ground mobile communication and satellite communication will be described.

In the ground mobile communication, a radius of a cell is generally small (for example, 200 m to a few km) and thus radio waves usually reach from a plurality of base stations. Consequently, it is relatively difficult to determine an interfered area and a not-interfered area. Meanwhile, in the satellite communication, the radius of a coverage area is large (for example, several hundred km to 1000 km) and thus it is relatively easy to determine the interfered area and the not-interfered area.

In addition, in the ground mobile communication, fading generally occurs due to movement of terminals, movement of surrounding people and vehicles, and surrounding buildings and thus strength of radio waves from a plurality of base stations varies relatively large over time. Meanwhile, line-of-sight communication is performed in the satellite communication, and thus received field strength varies relatively small over time.

Moreover, as the distance between a base station and a terminal is generally short in the ground mobile communication, a delay in reporting a measurement result of the terminal to the base station is relatively small. Meanwhile, as a report is made from a receiver mounted on an airplane or a ship via a satellite to a ground station in the satellite communication, the delay is relatively large.

In general, it is difficult to predict a movement path of people or vehicles in the ground mobile communication. Meanwhile, as the movement path of the airplane or the ship having the receiver mounted thereon is usually determined in advance and a movement direction is usually fixed in the satellite communication, it is easy to predict the movement path.

In view of the differences described above, the present disclosure that suppresses interference in an overlap region and improves throughput in a multibeam satellite communication system has been achieved. Hereinafter, exemplary embodiments of the present disclosure will be described in detail with reference to the drawings.

Outline of Satellite Communication System

Figure 5:
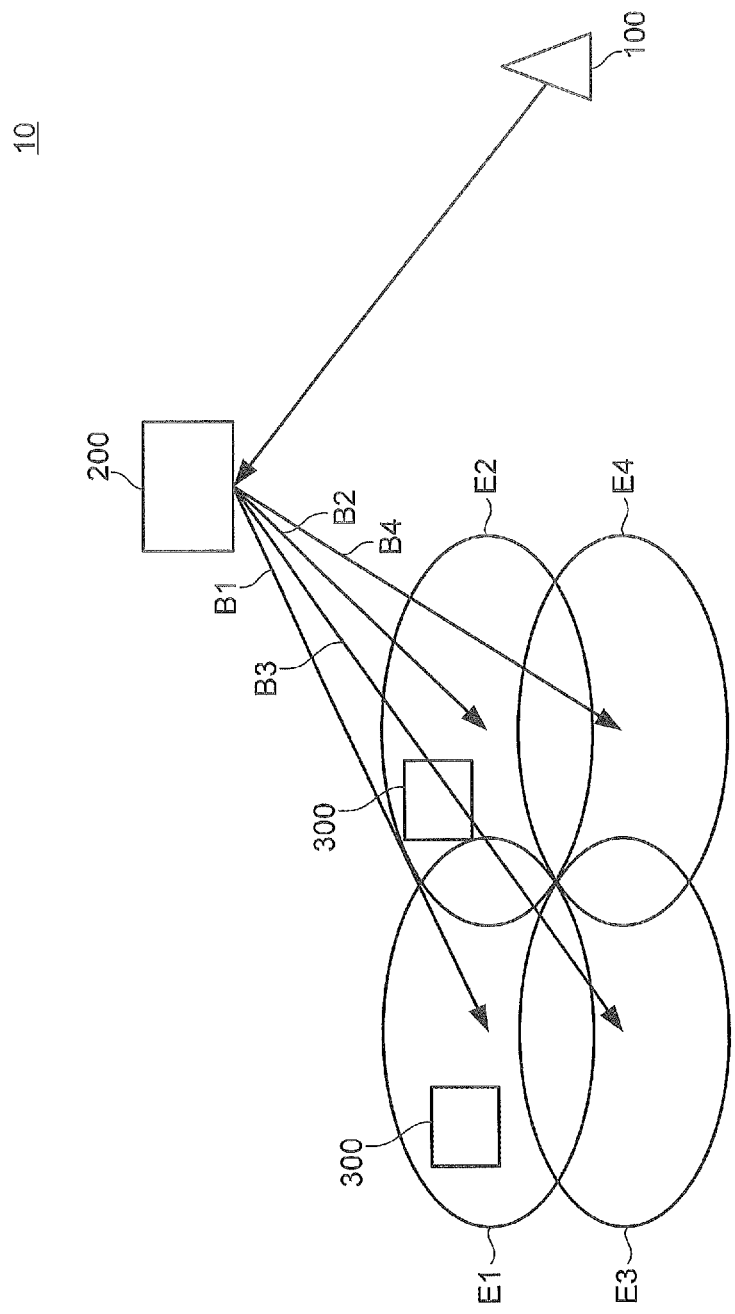
FIG. 5 illustrates a configuration of a satellite communication system according to a first exemplary embodiment of the present disclosure.

FIG. 5 illustrates an example of satellite communication system 10. Satellite communication system 10 is constituted by ground station (transmitter) 100, satellite station 200, and receiver 300. Satellite station 200 is an HTS satellite with a multibeam system. Each of beams B1, B2, B3, B4 forms a conical beam pattern toward a proximity of ground and is irradiated to each of coverage areas E1, E2, E3, E4 near the ground.

Ground station 100 transmits signals addressed to respective receivers 300 to satellite station 200. Satellite station 200 functions as a relay station and transmits the signals received from ground station 100 to respective receivers 300.

Specifically, satellite station 200 divides the signals received from ground station 100 into signals addressed to respective receivers 300 by a filter and transmits the signals addressed to respective receivers 300 by beams corresponding respectively to coverage areas where receiver 300 is present.

There is no obstacle between satellite station 200 and each of receivers 300 and thus line-of-sight communication is performed between satellite station 200 and each of receivers 300.

First Exemplary Embodiment

Figure 6:
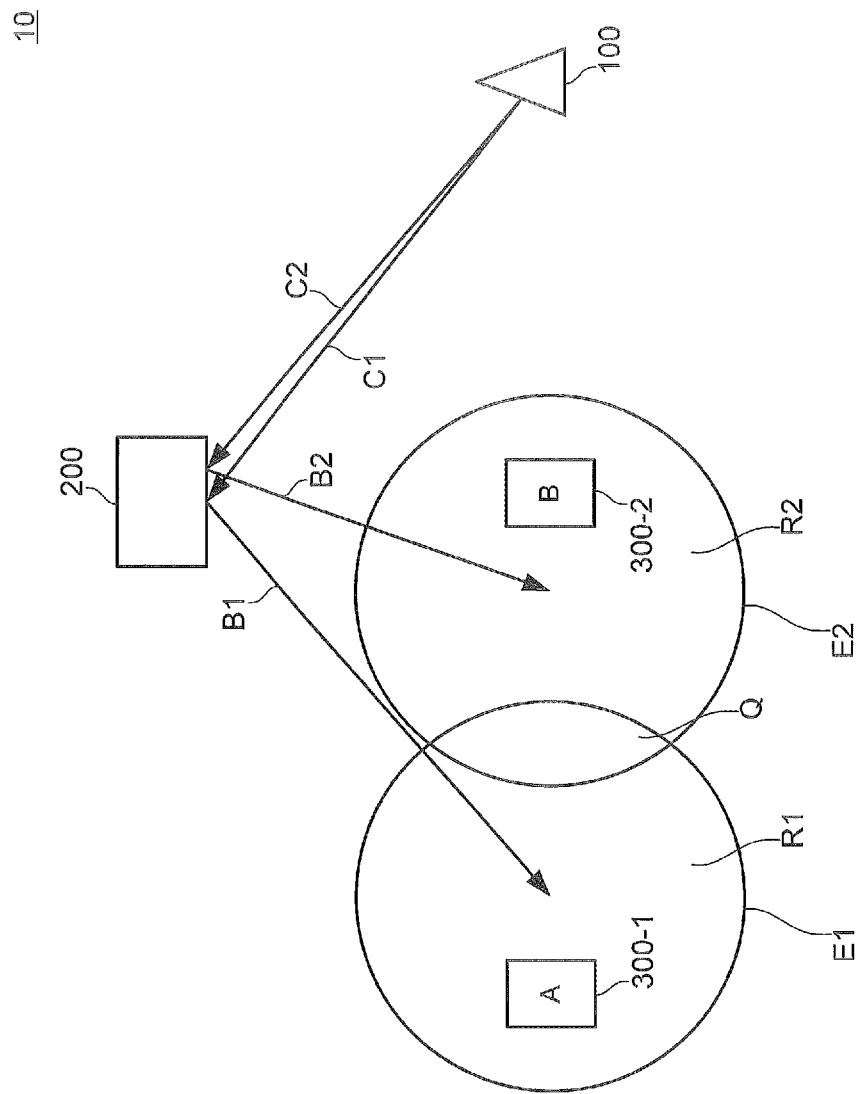
FIG. 6 illustrates an example of an arrangement pattern of receivers in the satellite communication system according to the first exemplary embodiment of the present disclosure.

A first exemplary embodiment will describe a case where, as illustrated in FIG. 6, ground station 100 communicates with two receivers 300-1, 300-2 at the same time via satellite station 200 and satellite station 200 forms two beams B1, B2 (coverage areas E1, E2) for simplifying the description.

It is assumed in FIG. 6 that receiver 300-1 is mounted on airplane A and receiver 300-2 is mounted on airplane B. In addition, FIG. 6 illustrates a case where airplane A is present in area R1 of coverage area E1 except for overlap region Q, whereas airplane B is present in area R2 of coverage area E2 except for overlap region Q.

Ground station 100 transmits signals by wireless channel C1 for beam B1 and wireless channel C2 for beam B2. Satellite station 200 transmits the signal in wireless channel C1 by beam B1 and the signal in wireless channel C2 by beam B2. The frequency of the signal transmitted by beam B1 is equal to the frequency of the signal transmitted by beam B2.

Configuration of Ground Station

Figure 7:
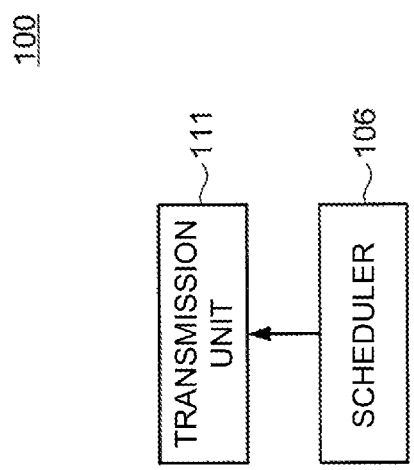
FIG. 7 is a block diagram illustrating a part of configuration of a ground station according to the first exemplary embodiment of the present disclosure.

FIG. 7 is a block diagram illustrating a part of configuration of ground station 100 according to the first exemplary embodiment. In ground station 100 illustrated in FIG. 7, scheduler 106 performs scheduling to determine a time and wireless channels C1, C2 to transmit transmission data A addressed to receiver 300-1 and transmission data B addressed to receiver 300-2 based on the area (R1, Q, R2) where each of receivers 300-1, 300-2 is present. Transmission unit 111 transmits transmission data A, B to satellite station 200 by the wireless channel determined by scheduler 106 at the time determined by scheduler 106.

Figure 8:
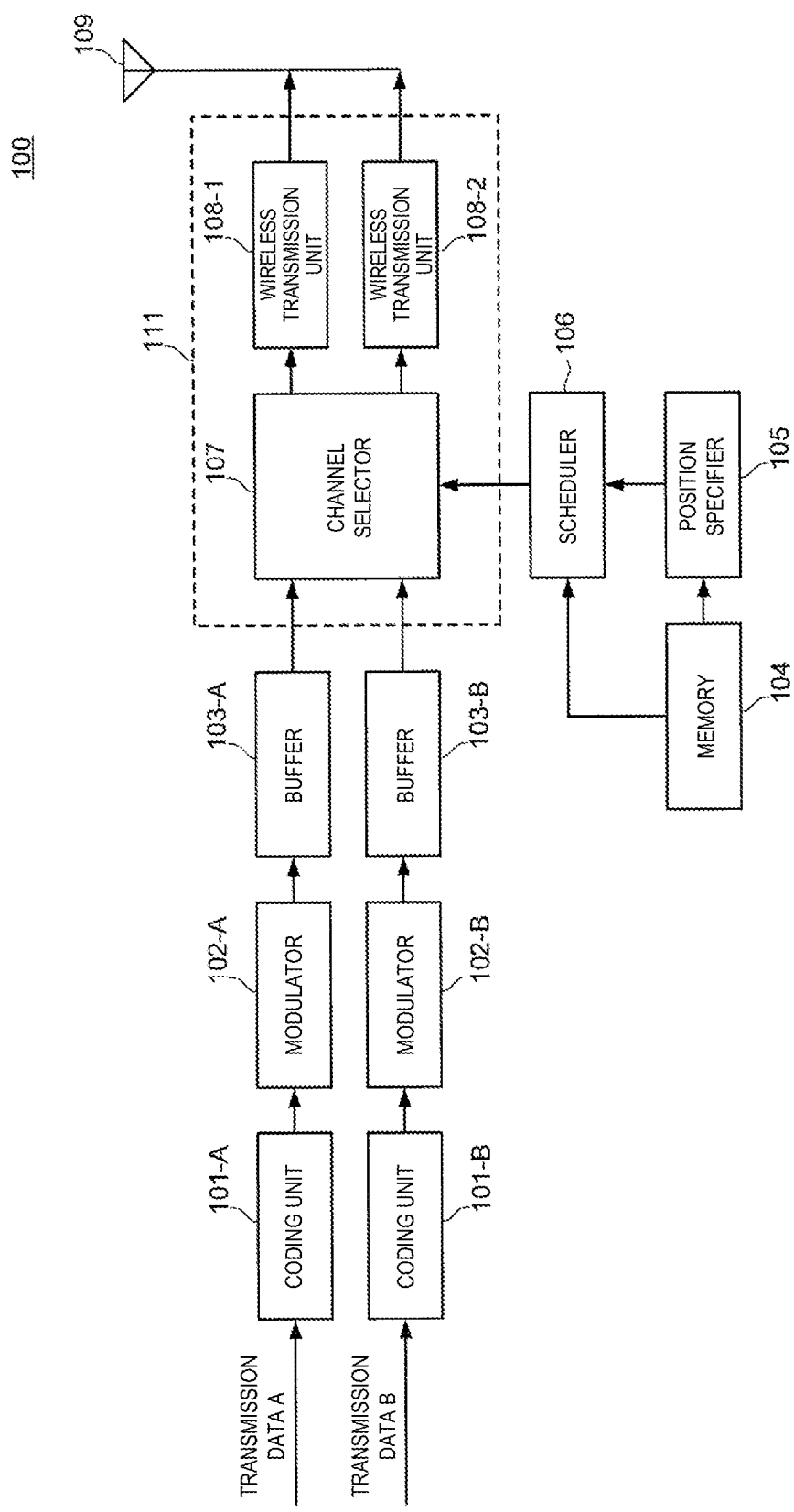
FIG. 8 is a block diagram of the configuration of the ground station according to the first exemplary embodiment of the present disclosure.

FIG. 8 is a block diagram of the configuration of ground station 100 according to the first exemplary embodiment. As illustrated in FIG. 8, ground station 100 is mainly constituted by coding units 101-A, 101-B, modulators 102-A, 102-B, buffers 103-A, 103-B, memory 104, position specifier 105, scheduler 106, channel selector 107, wireless transmission units 108-1, 108-2, and antenna 109. Transmitter 111 is constituted by channel selector 107 and wireless transmission units 108-1, 108-2.

Coding unit 101-A codes transmission data A addressed to airplane A (receiver 300-1) and outputs coded data A to modulator 102-A. Coding unit 101-B codes transmission data B addressed to airplane B (receiver 300-2) and outputs coded data B to modulator 102-B.

Modulator 102-A modulates coded data A and outputs modulated data A to buffer 103-A. Modulator 102-B modulates coded data B and outputs modulated data B to buffer 103-B.

Buffer 103-A temporarily stores modulated data A. Buffer 103-B temporarily stores modulated data B.

Memory 104 stores coverage areas E1, E2 of beams B1, B2 from satellite station 200, operation plans for airplanes A, B, and the like.

Position specifier 105 specifies current positions of airplane A, B based on the operation plans for airplanes A, B stored in memory 104. Position specifier 105 may obtain information indicating the positions of airplanes A, B (hereinafter, referred to as "position information") from receiver 300-1, 300-2. In this case, ground station 100 may receive a signal including the position information via satellite station 200 or through other communication paths. Position specifier 105 outputs the position information to scheduler 106.

A frequency of updating the positions of airplanes A, B specified by position specifier 105 may be low as long as the areas where airplanes A, B are present can be determined.

Scheduler 106 determines the areas (R1, Q, R2) where airplanes A, B are present based on the position information output from position specifier 105 and coverage areas E1, E2 stored in memory 104. Scheduler 106 performs scheduling to determine the times and wireless channels C1, C2 to transmit transmission data A, B based on the areas where airplanes A, B are present. Scheduling by scheduler 106 will be described later in detail.

Scheduler 106 controls channel selector 107 based on a result of scheduling. Scheduler 106 notifies receiver 300 of the result of scheduling.

Channel selector 107 outputs modulated data A stored in buffer 103-A and modulated data B stored in buffer 103-B to at least one of wireless transmission unit 108-1 and wireless transmission unit 108-2 according to the control of scheduler 106.

Wireless transmission unit 108-1 performs wireless transmission processing such as up-conversion and amplification on modulated data A or modulated data B output from channel selector 107 and transmits resultant modulated data A or B from antenna 109 to satellite station 200 by wireless channel C1. Wireless transmission unit 108-2 performs the wireless transmission processing on modulated data A or modulated data B output from channel selector 107 and transmits resultant modulated data A or B from antenna 109 to satellite station 200 by wireless channel C2.

Configuration of Satellite Station

Figure 9:
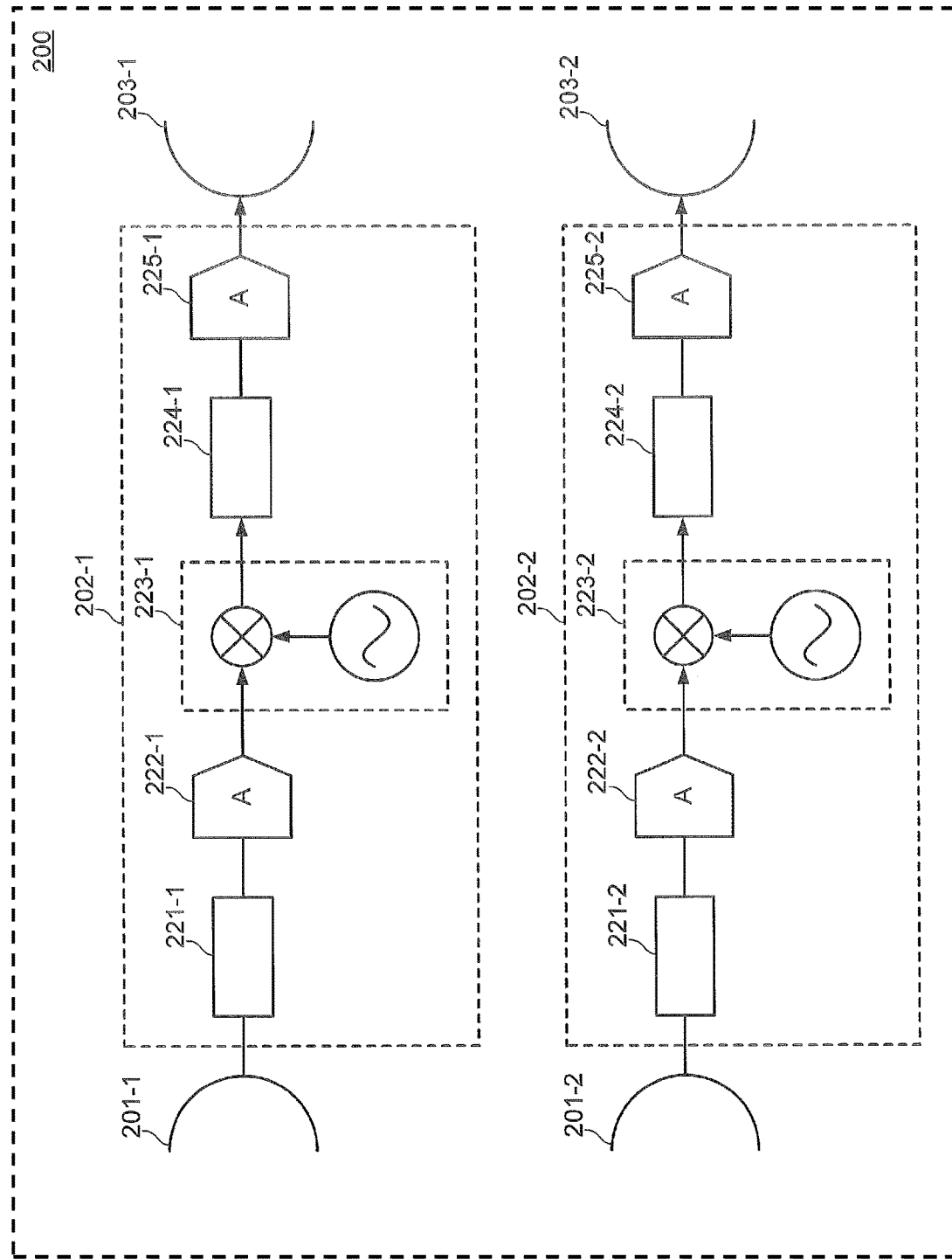
FIG. 9 is a block diagram of a configuration of a satellite station.

FIG. 9 is a block diagram of a configuration of satellite station 200. The configuration of satellite station 200 is similar to a conventional configuration.

Satellite station 200 includes receiving antennas 201-1, 201-2, transponders 202-1, 202-2, and transmitting antennas 203-1, 203-2. Transmitting antennas 203-1, 203-2 configure a multibeam transmitting antenna.

Transponder 202-1 includes bandpass filter 221-1, amplifier 222-1, frequency converter 223-1, bandpass filter 224-1, and amplifier 225-1. Similarly, transponder 202-2 includes bandpass filter 221-2, amplifier 222-2, frequency converter 223-2, bandpass filter 224-2, and amplifier 225-2. Transponders 202-1, 202-2 can adjust an oscillation frequency to be multiplied by input signals from receiving antennas 201-1, 201-2 such that the frequencies of signals transmitted from transmitting antennas 203-1, 203-2 are the same.

Antenna 201-1 receives a wireless frequency signal transmitted from ground station 100 by wireless channel C1. Antenna 201-2 receives a wireless frequency signal transmitted from ground station 100 by wireless channel C2.

Bandpass filter 221-1 filters the wireless frequency signal received by antenna 201-1 to acquire a signal from wireless channel C1 and outputs the signal to amplifier 222-1. Bandpass filter 221-2 filters the wireless frequency signal received by antenna 201-2 to acquire a signal from wireless channel C2 and outputs the signal to amplifier 222-2.

Amplifier 222-1 amplifies the signal having passed through bandpass filter 221-1 and outputs the amplified signal to frequency converter 223-1. Amplifier 222-2 amplifies the signal having passed through bandpass filter 221-2 and outputs the amplified signal to frequency converter 223-2.

Frequency converter 223-1 converts the frequency of the signal output from amplifier 222-1 into a predetermined output frequency and outputs the resultant signal to bandpass filter 224-1. Frequency converter 223-2 converts the frequency of the signal output from amplifier 222-2 into a predetermined output frequency and outputs the resultant signal to bandpass filter 224-2.

Bandpass filter 224-1 filters the signal output from frequency converter 223-1 and outputs the filtered signal to amplifier 225-1. Bandpass filter 224-2 filters the signal output from frequency converter 223-2 and outputs the filtered signal to amplifier 225-2.

Amplifier 225-1 amplifies the signal having passed through bandpass filter 224-1 and outputs the amplified signal to transmitting antenna 203-1. Amplifier 225-2 amplifies the signal having passed through bandpass filter 224-2 and outputs the amplified signal to transmitting antenna 203-2.

Transmitting antenna 203-1 transmits the signal output from amplifier 225-1 by beam B1. Transmitting antenna 203-2 transmits the signal output from amplifier 225-2 by beam B2.

As a result, a signal in wireless channel C1 at ground station 100 (transmission data A or transmission data B) is transmitted from satellite station 200 by beam B1. A signal in wireless channel C2 at ground station 100 (transmission data A or transmission data B) is transmitted from satellite station 200 by beam B2.

Configuration of Receiver

Figure 10:
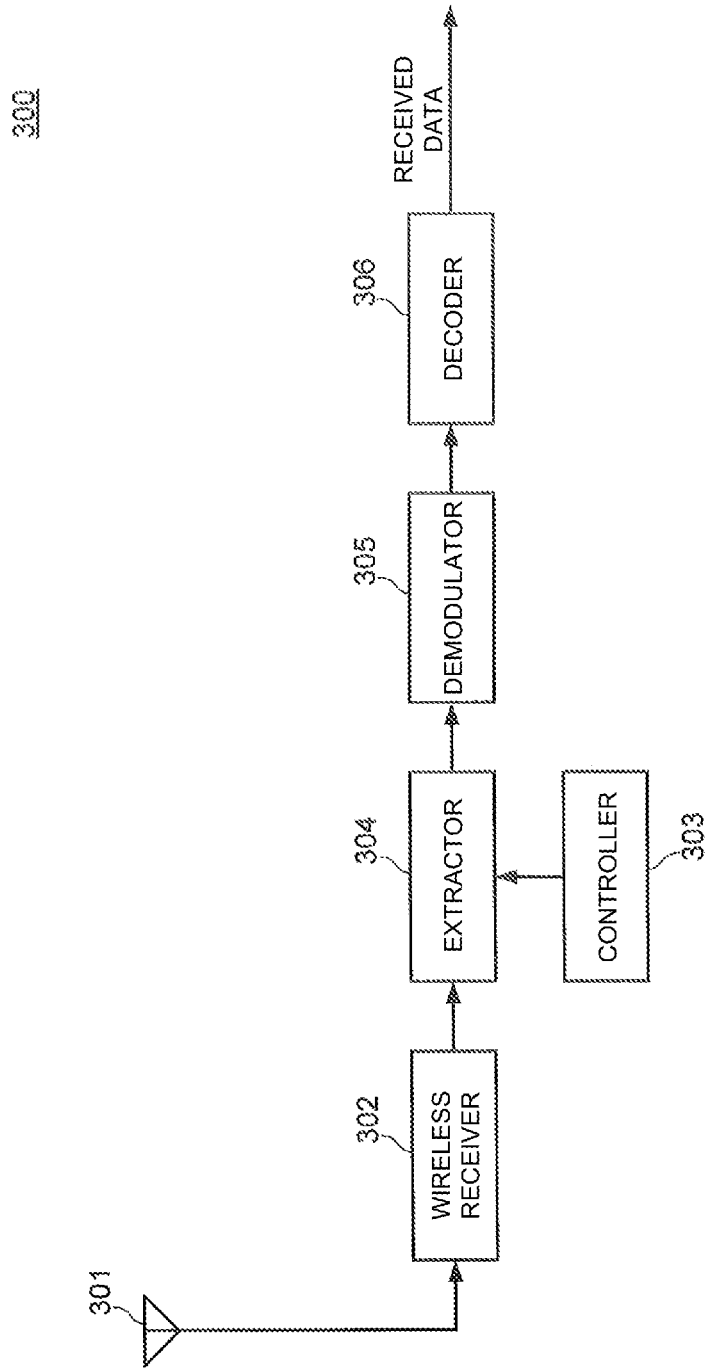
FIG. 10 is a block diagram of a configuration of the receiver according to the first exemplary embodiment of the present disclosure.

FIG. 10 is a block diagram of a configuration of receiver 300 according to the first exemplary embodiment. With reference to FIG. 10, receiver 300 includes antenna 301, wireless receiver 302, controller 303, extractor 304, demodulator 305, and decoder 306.

Wireless receiver 302 performs wireless receiving processing such as amplification and down-conversion on a wireless frequency signal that is transmitted from satellite station 200 by at least one of beam B1 and beam B2 and received by antenna 301, and outputs the received signal in a baseband to extractor 304.

Controller 303 controls a timing when extractor 304 extracts a signal addressed to an own station according to a result of scheduling notified from ground station 100.

Extractor 304 extracts a signal addressed to an own station from the received signal output from wireless receiver 302 according to the control of controller 303.

Demodulator 305 demodulates the received signal output from extractor 304 by a demodulation method corresponding to a modulation method of modulator 102 and outputs the demodulated data to decoder 306.

Decoder 306 decodes the demodulated data output from demodulator 305 by a decoding method corresponding to a coding method of coding unit 101 and obtains received data.

Receiver 300 may include a global positioning system (GPS) antenna and detect the position of receiver 300 using a signal transmitted from a satellite and received by the GPS antenna. In this case, a signal including position information of receiver 300 is transmitted to ground station 100.

Details of Scheduling

Next, scheduling performed by scheduler 106 in ground station 100 will be described in detail.

Scheduler 106 determines data to be transmitted by wireless channels C1, C2 depending on the areas (R1, Q, R2) where airplanes A, B are present.

A case where there is no airplane in overlap region Q as illustrated in FIG. 6 will be described first. In an example of FIG. 6, airplane A having receiver 300-1 mounted thereon is present in area R1 of coverage area E1 except for overlap region Q, whereas airplane B having receiver 300-2 mounted thereon is present in area R2 of coverage area E2 except for overlap region Q.

In this case, receiver 300-1 can receive a signal transmitted by beam B1 but cannot receive a signal transmitted by beam B2. Similarly, receiver 300-2 can receive the signal transmitted by beam B2 but cannot receive the signal transmitted by beam B1.

No interference occurs in area R1, and thus receiver 300-1 can receive the signal transmitted by beam B1 even if a signal is transmitted by beam B2. Similarly, no interference occurs in area R2, and thus receiver 300-2 can receive the signal transmitted by beam B2 even if a signal is transmitted by beam B1.

Figure 11:
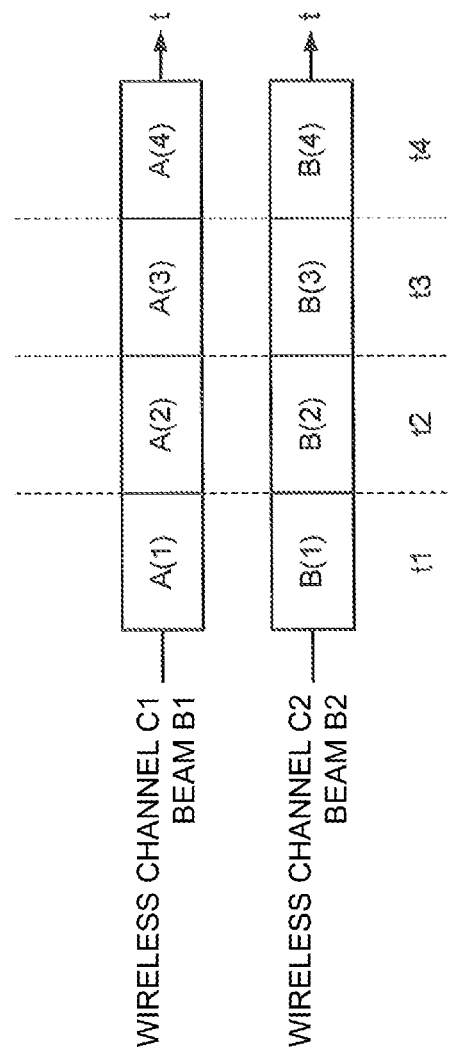
FIG. 11 illustrates an example of scheduling in a case of FIG. 6 in the first exemplary embodiment of the present disclosure.

Therefore, when there is no airplane in overlap region Q, scheduler 106 performs scheduling to successively transmit transmission data A, B as illustrated in FIG. 11.

Ground station 100 successively transmits transmission data A(1) A(2), A(3), A(4) to satellite station 200 at successive times t1, t2, t3, t4, respectively by wireless channel C1. At the same time, ground station 100 successively transmits transmission data B(1), B(2), B(3), B(4) to satellite station 200 at successive times t1, t2, t3, t4, respectively by wireless channel C2.

As a result, transmission data A(1), A(2), A(3), A(4) are successively transmitted from satellite station 200 at times t1, t2, t3, t4, respectively by beam B1. At the same time, transmission data B(1), B(2), B(3), B(4) are successively transmitted from satellite station 200 at times t1, t2, t3, t4, respectively by beam B2.

Receiver 300-1 receives transmission data A(1), A(2), A(3), A(4) from beam B1 at times t1, t2, t3, t4, respectively. Receiver 300-2 receives transmission data B(1), B(2), B(3), B(4) from beam B2 at times t1, t2, t3, t4, respectively.

As described above, when all the receivers are present in the areas where no interference occurs except for an overlap region, data is successively transmitted to the receivers at the same frequency.

Figure 12:
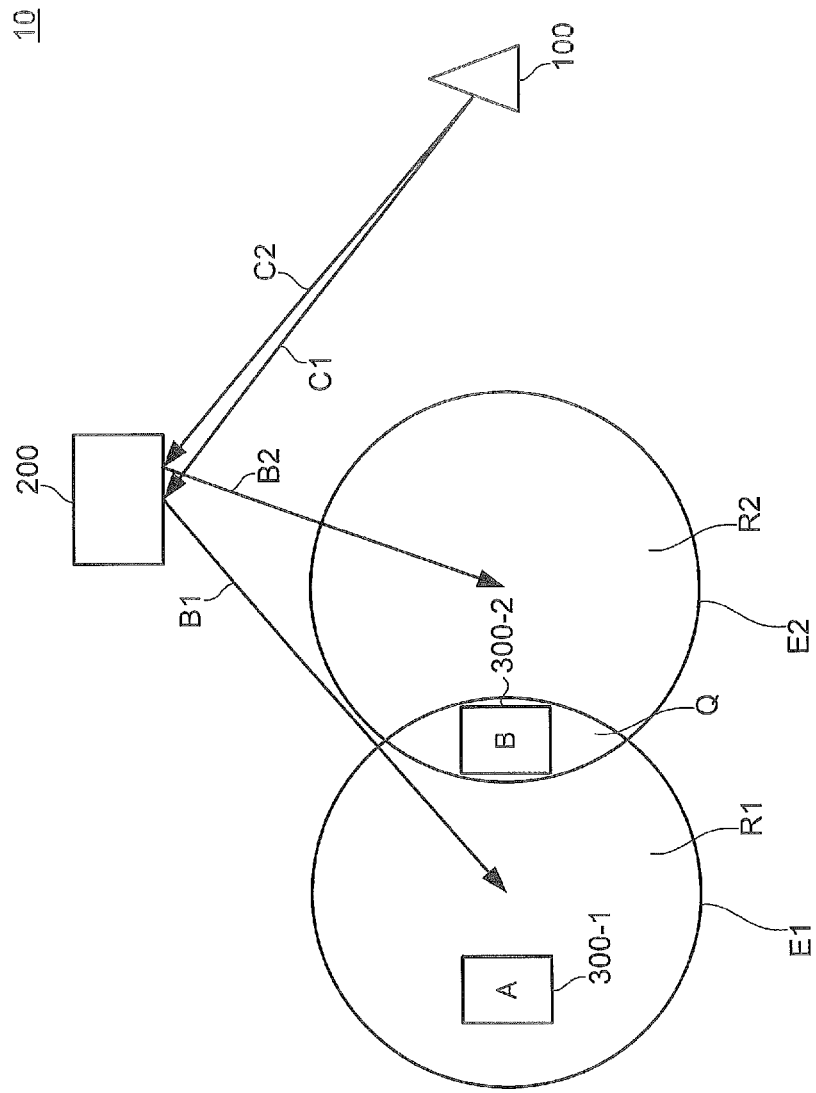
FIG. 12 illustrates another example of the arrangement pattern of receivers in the satellite communication system according to the first exemplary embodiment of the present disclosure.

Next, a case where one airplane is present in overlap region Q as illustrated in FIG. 12 will be described. In an example of FIG. 12, airplane A is present in area R1 and airplane B is present in overlap region Q.

In this case, receiver 300-1 can receive a signal transmitted by beam B1 but cannot receive a signal transmitted by beam B2.

Meanwhile, receiver 300-2 can receive both the signal transmitted by beam B1 and the signal transmitted by beam B2. In addition, a path length of beam B1 is almost equal to a path length of beam B2 between satellite station 200 and airplane B. Receiver 300-2 can thus receive the both signals within a guard interval of an orthogonal frequency division multiplexing (OFDM) signal used in LTE. Consequently, receiver 300-2 can combine the same signals (transmission data B) transmitted by beams B1, B2 at antenna 301.

When different signals are transmitted from beams B1, B2, interference occurs in overlap region Q. For example, when a signal of transmission data A is transmitted by beam B1 and at the same time a signal of transmission data B is transmitted by beam B2, receiver 300-2 cannot receive the signal (transmission data B) from beam B2 due to interference of the signal from beam B1.

Figure 13:
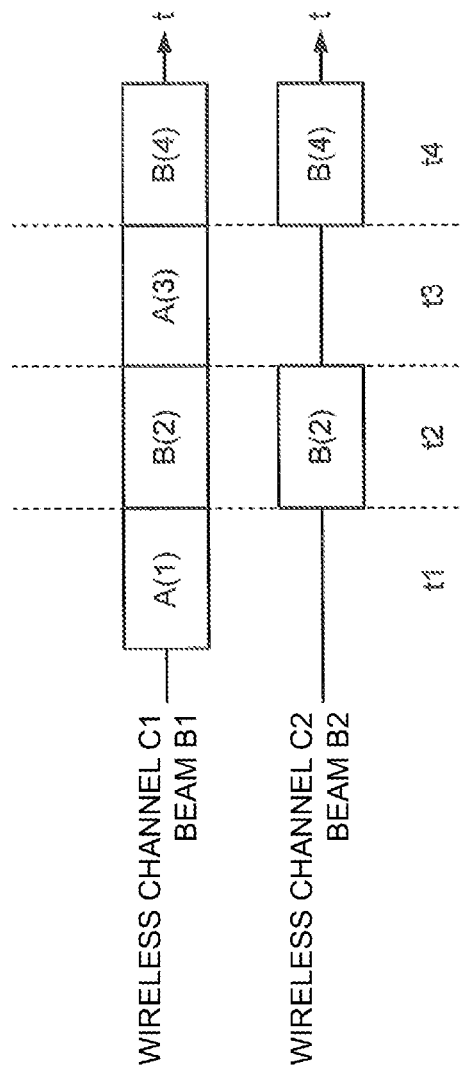
FIG. 13 illustrates an example of scheduling in a case of FIG. 12 in the first exemplary embodiment of the present disclosure.

When one airplane is present in overlap region Q, as illustrated in FIG. 13, scheduler 106 performs scheduling to perform time division transmission so as to prevent the interference and perform multibeam transmission to receiver 300-2 in overlap region Q.

As illustrated in an example of FIG. 13, ground station 100 transmits transmission data A(1), B(2), A(3), B(4) to satellite station 200 at times t1, t2, t3, t4, respectively by wireless channel C1. In addition, ground station 100 intermittently transmits transmission data B(2), B(4) to satellite station 200 at times t2, t4, respectively by wireless channel C2.

As a result, transmission data A(1), B(2), A(3), B(4) are successively transmitted from satellite station 200 at times t1, t2, t3, t4, respectively by beam B1. In addition, transmission data B(2), B(4) are intermittently transmitted from satellite station 200 at times t2, t4, respectively by beam B2.

Receiver 300-1 receives transmission data A(1), A(3) transmitted by beam B1 at times t1, t3, respectively. Receiver 300-2 receives transmission data B(2), B(4) from beams B1, B2 at times t2, t4, respectively and combines the transmission data.

As the data are combined, power received by receiver 300-2 increases and thus the SN ratio increases accordingly. As the SN ratio is increased, the frequency usage efficiency is improved.

Figure 14:
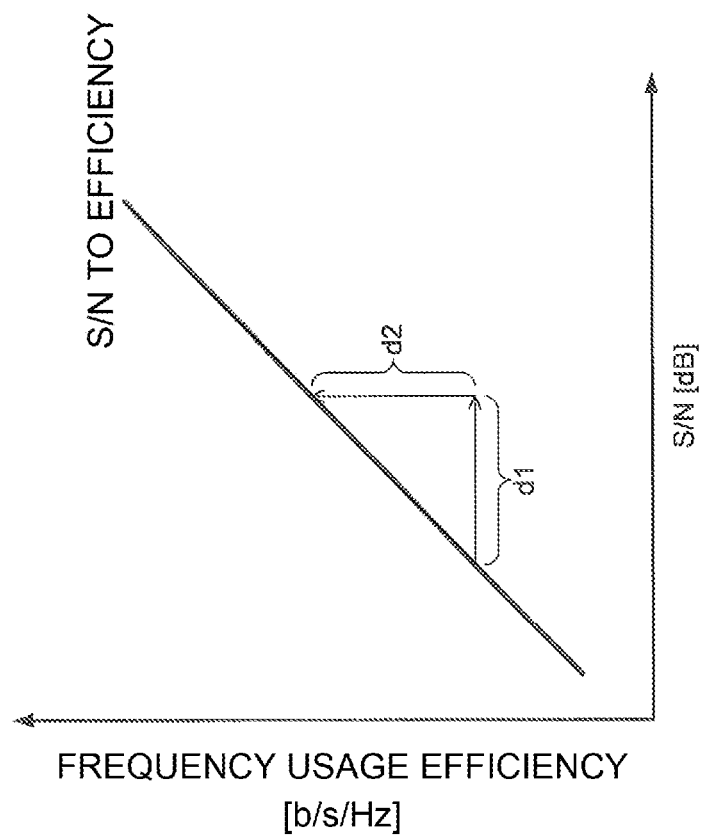
FIG. 14 is an explanatory view of improvement in frequency usage efficiency.

FIG. 14 is a graph for explaining improvement in frequency usage efficiency. In the graph, a horizontal axis represents an SN ratio (dB) of a wireless transmission path and a vertical axis represents frequency usage efficiency (b/s/Hz) of the wireless transmission path. A line indicating a relationship between the SN ratio of the wireless transmission path and the frequency usage efficiency of the wireless transmission path is plotted in the graph.

It is assumed that the SN ratios of beams B1, B2 constituting the wireless transmission path of airplane B are denoted by $S/N_1(2)$, $S/N_2(2)$, respectively. Combined SN ratio $S/N_{12}(2)$ of beam B1 and beam B2 is calculated by the following expression (1).

[Expression 1]

$$S/N_{12}(2)=S/N_1(2)+S/N_2(2) \tag{1}$$

As can be seen from the expression (1), combined SN ratio $S/N_{12}(2)$ is larger than SN ratio $S/N_1(2)$ of beam B1 and SN ratio $S/N_2(2)$ of beam B2. Consequently, as beam B1 is combined with beam B2 the SN ratio is improved by d1 (dB) as illustrated in FIG. 14. As a result, it is found that efficiency of the wireless transmission path is also improved by d2 (b/s/Hz). For example, a carrier-to-noise (CN) ratio is improved by 3 dB. As described above, the SN ratio is improved by combining beams B1, B2. Ground station 100 can thus transmit data to airplane B with higher frequency usage efficiency.

Effects of First Exemplary Embodiment

According to the present exemplary embodiment, the time and a wireless channel to transmit data to each receiver are determined based on the area where each receiver is present, and the data is transmitted at the same frequency according to the determination. Specifically, when all the receivers are present in the area where no interference occurs except for an overlap region, data is successively transmitted to the receivers, so that a usage rate of resources is kept. When some receivers are present in the overlap region, the time division transmission is performed. In addition, the same data is transmitted to the receivers in the overlap region by the multibeam. As a result, the SN ratio is improved by combining power. It is thus possible to suppress interference in the overlap region and improve throughput of an overall system.

First Modification of First Exemplary Embodiment

As described above, when one airplane is present in overlap region Q (FIG. 12, FIG. 13), with time division multiplexing, a receiving time allocated to receiver 300-1 is ½ of the whole time and thus a transmission rate decreases. The receiving time allocated to receiver 300-2 is also ½ of the whole time. However, as signals from beams B1, B2 are combined and received, the SN ratio is improved. Consequently, the transmission rate of receiver 300-2 is higher than the transmission rate of receiver 300-1. As described above, when one airplane is present in overlap region Q, two extreme results are obtained at the same time, that is, one transmission rate decreases whereas the other transmission rate increases.

In a first modification of the present exemplary embodiment, to eliminate the state where one transmission rate decreases whereas the other transmission rate increases at the same time, an increased amount of the transmission rate of receiver 300-2 is distributed to the transmission rate of receiver 300-1.

Specifically, scheduler 106 controls a receiving period of each of receivers 300-1, 300-2 such that the transmission rate of receiver 300-1 is equal to the transmission rate of receiver 300-2.

For example, in the state of FIG. 12, airplane A (receiver 300-1) reports SN ratio $S/N_1(1)$ of beam B1 to ground station 100. In addition, airplane B (receiver 300-2) reports SN ratio $S/N_1(2)$ of beam B1 and SN ratio $S/N_2(2)$ of beam B2 to ground station 100.

In general, transmission volume C(b/s) available in a wireless transmission path from satellite station 200 to each of airplanes A, B depends on the SN ratio of corresponding one of beams B1, B2. Specifically, C is calculated from the following expression (2) by a Shannon's theorem.

[Expression 2]

$$C=B \log_2(1+S/N) \tag{2}$$

In the expression (2), B denotes a bandwidth (Hz) of the wireless transmission path, S denotes signal power (W), and N denotes noise power (W).

Combined SN ratio $S/N_{12}(2)$ of beams B1, B2 is calculated from the above expression (1) using the SN ratios of beams B1, B2 received by receiver 300-2.

Next, the Shannon's theorem is used to calculate transmission volume C(1) of the wireless transmission path to receiver 300-1 and transmission volume C(2) of the wireless transmission to receiver 300-2 from the following expressions (3), (4).

[Expression 3]

$$C(1)=B \log_2(1+S/N_2(2)) \tag{3}$$

[Expression 4]

$$C(2)=B \log_2(1+S/N_{12}(2)) \tag{4}$$

Figure 15:
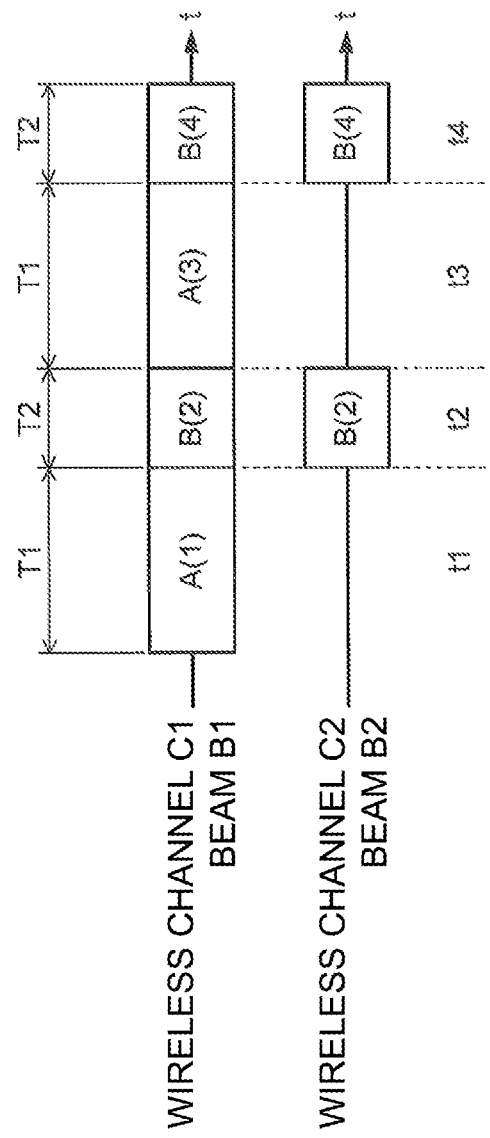
FIG. 15 illustrates an example of scheduling in the case of FIG. 12 in a first modification of the first exemplary embodiment of the present disclosure.

Consequently, scheduler 106 determines period T1 during which data is transmitted to receiver 300-1 and period T2 during which data is transmitted to receiver 300-2 so as to satisfy the following expression (5). As illustrated in FIG. 15, period T1 can be longer than period T2, and thus equivalent transmission rates are respectively distributed to receivers 300-1, 300-2.

[Expression 5]

$$T1 \times C(1) = T2 \times C(2) \tag{5}$$

As another example, scheduler 106 may control periods T1, T2 such that a degree of sufficiency of communication volume D(1) requested by receiver 300-1 is equal to a degree of sufficiency of communication volume D(2) requested by receiver 300-2.

For example, it is assumed in the state of FIG. 12 that receiver 300-1 reports the SN ratio of beam B1 to ground station 100 and requests communication volume D(1) from ground station 100. Moreover, it is assumed that receiver 300-2 reports the SN ratios of beams B1, B2 to ground station 100 and requests communication volume D(2) from ground station 100.

Scheduler 106 determines period T1 during which data is transmitted to receiver 300-1 and period T2 during which data is transmitted to receiver 300-2 so as to satisfy the following expression (6). Transmission rates are respectively distributed to receivers 300-1, 300-2 such that the degree of sufficiency of communication volume D(1) requested is equal to the degree of sufficiency of communication volume D(2) requested.

[Expression 6]

$$T1 \times C(1)/D(1) = T2 \times C(2)/D(2) \tag{6}$$

Effects of First Modification of First Exemplary Embodiment

As described above, in the first modification of the present exemplary embodiment, period T1 during which data is transmitted to a receiver in an overlap region and period T2 during which data is transmitted to a receiver outside the overlap region are adjusted. As the transmission rate is distributed to the receivers, the transmission rates of the receivers are leveled.

Second Modification of First Exemplary Embodiment

Figure 16:
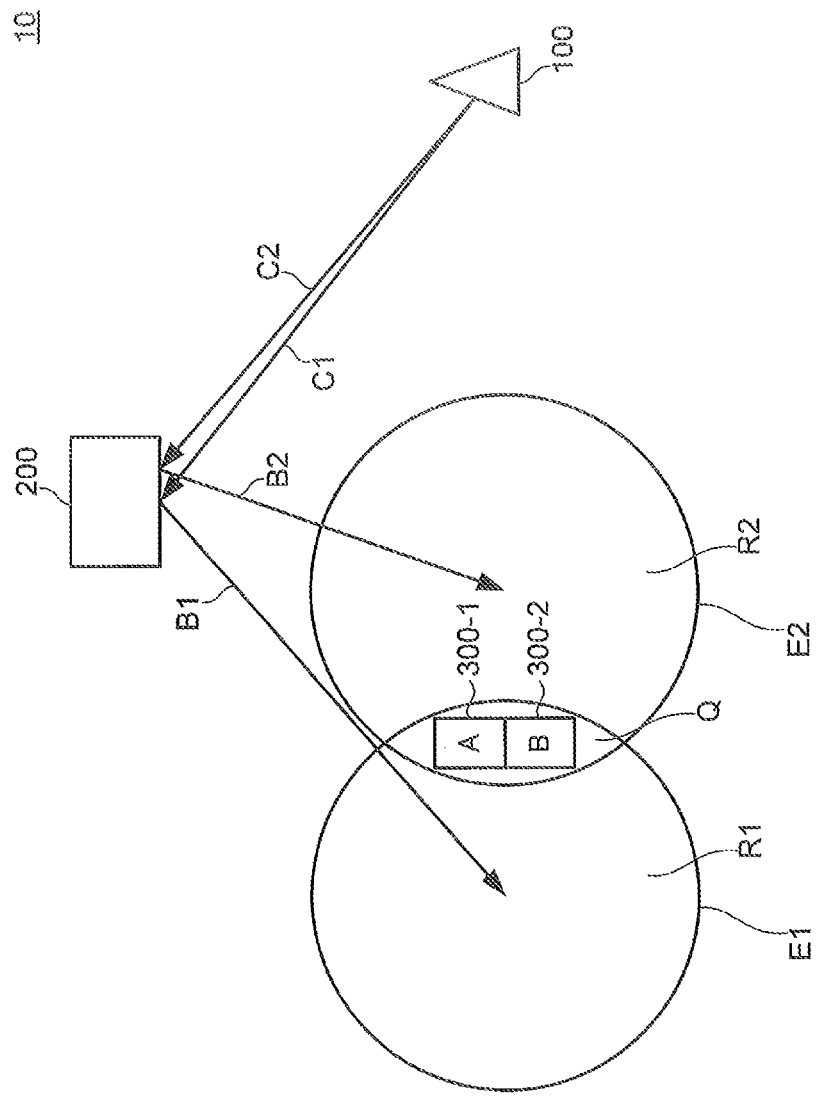
FIG. 16 illustrates an example of an arrangement pattern of receivers in a satellite communication system according to a second modification of the first exemplary embodiment of the present disclosure.

A second modification of the present exemplary embodiment will describe a case where airplane A having receiver 300-1 mounted thereon and airplane B having receiver 300-2 mounted thereon are present in overlap region Q as illustrated in FIG. 16. Scheduler 106 pairs airplanes A, B in overlap region Q based on position information of airplanes A, B obtained from position specifier 105.

Figure 17:
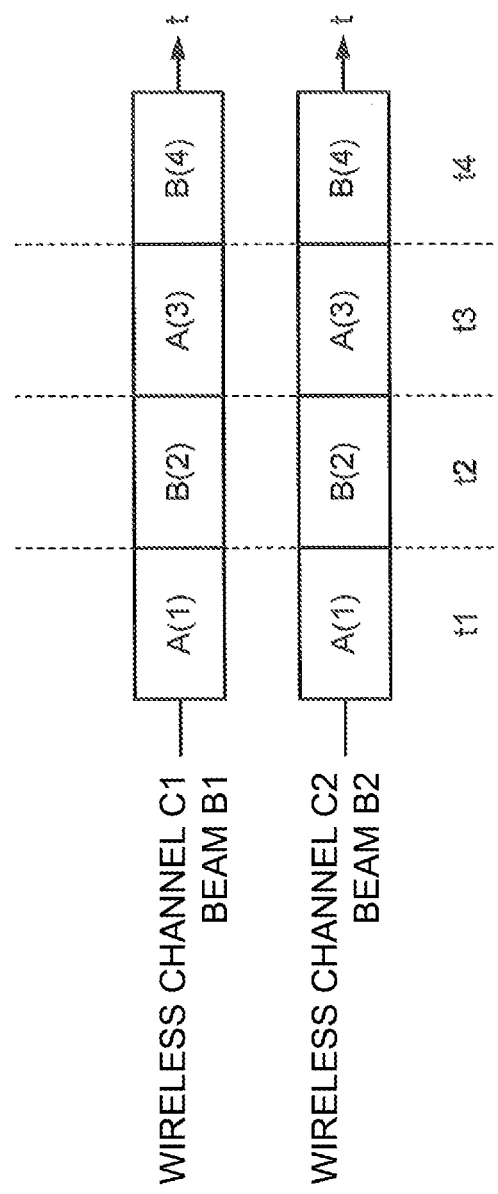
FIG. 17 illustrates an example of scheduling in a case of FIG. 16 in the second modification of the first exemplary embodiment of the present disclosure.

In this case, as illustrated in FIG. 17, ground station 100 transmits transmission data A(1), A(3) to satellite station 200 at times t1, t3 respectively by wireless channels C1, C2. In addition, ground station 100 transmits transmission data B(2), B(4) to satellite station 200 at times t2, t4, respectively by wireless channels C1, C2.

As a result, transmission data A(1), B(2), A(3), B(4) are successively transmitted from satellite station 200 at times t1, t2, t3, t4, respectively by beams B1, B2.

Receiver 300-1 receives transmission data A(1), A(3) transmitted by beams B1, B2 at times t1, t3, respectively. Receiver 300-2 receives transmission data B(2), B(4) transmitted by beams B1, B2 at times t2, t4, respectively.

In this case, both receivers 300-1, 300-2 can combine the same signals (transmission data B) transmitted by beams B1, B2 at antenna 301.

As the data are combined, power received by receivers 300-1, 300-2 increases and thus an SN ratio increases accordingly. As the SN ratio is increased, the frequency usage efficiency is improved.

Effects of Second Modification of First Exemplary Embodiment

As described above, in the second modification of the first exemplary embodiment, when a plurality of receivers are present in one overlap region, time division transmission is performed at the same frequency and the same data is transmitted to all the receivers in the overlap region by multibeam. It is thus possible to improve the SN ratio by combining power in all the receivers in the overlap region.

Third Modification of First Exemplary Embodiment

In general, an effect of an improvement in SN ratio by combining reception of beams B1, B2 is also obtained near overlap region Q (hereinafter, referred to as a "neighborhood area"). In view of the point described above, a third modification will describe a case where an airplane is present in the neighborhood area.

Figure 18:
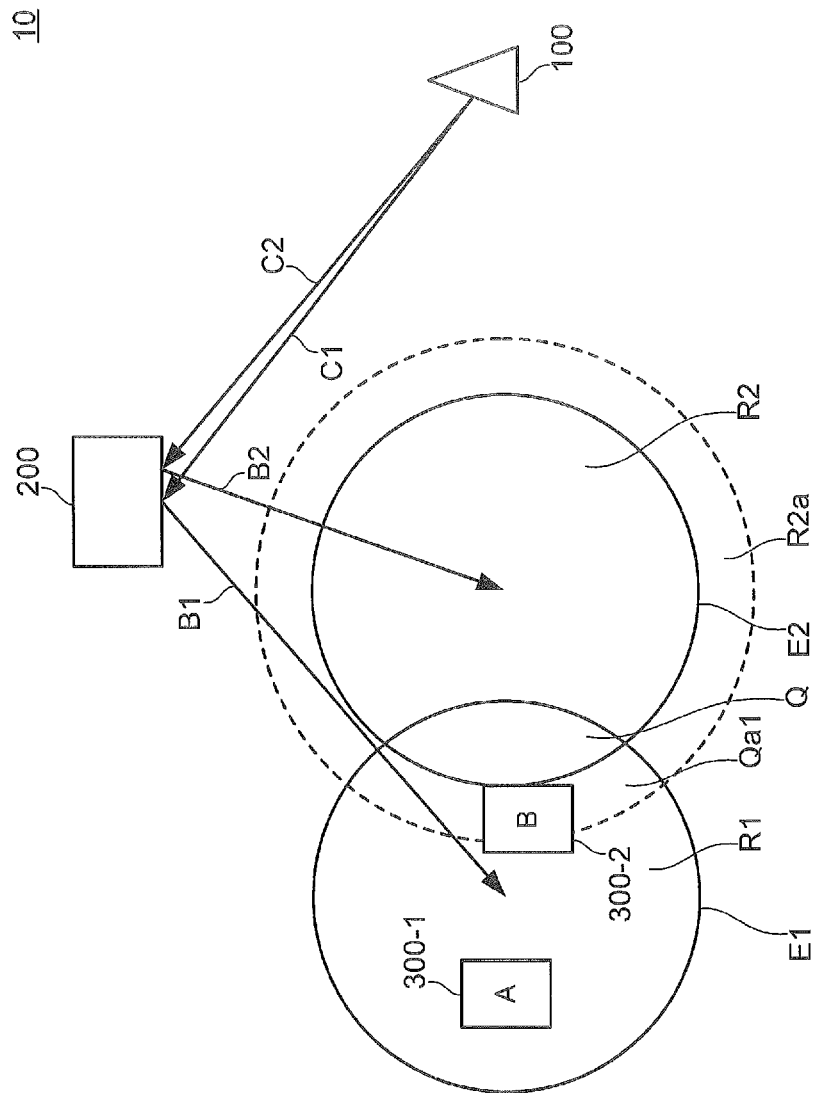
FIG. 18 illustrates an example of an arrangement pattern of receivers in a satellite communication system according to a third modification of the first exemplary embodiment of the present disclosure.

In an example of FIG. 18, airplane A is present in area R1 and airplane B is present in neighborhood area Qa1. Neighborhood area Qa1 is an area of an overlap region of area R2a (broken line) obtained by slightly extending coverage area R2 and coverage area R1 except for overlap region Q. The neighborhood area is an area where a ratio of signal power of a desired beam to signal power of a proximity beam, that is, signal power of desired beam/signal power of proximity beam is larger than or equal to a third threshold (for example, −6 dB) and less than a fourth threshold (for example, −3 dB).

Receiver 300-2 of airplane B in neighborhood area Qa1 can receive a signal transmitted by beam B1 with high received power for the signal to be demodulated alone and a signal transmitted by beam B2 with received power too low for the signal to be demodulated alone. By combining the signals transmitted by beams B1, B2 and demodulating the combined signal, reception quality is improved as compared to a case of demodulating the signal transmitted by beam B1 alone.

When one airplane is present in neighborhood area Qa1 (FIG. 18), scheduler 106 at ground station 100 performs scheduling like the example of FIG. 13.

Receiver 300-1 receives transmission data A(1), A(3) transmitted by beam B1 at times t1, t3, respectively. Receiver 300-2 receives transmission data B(2), B(4) from beams B1, B2 at times t2, t4, respectively and combines the transmission data.

As the data are combined, power received by receiver 300-2 increases and thus an SN ratio increases accordingly. As the SN ratio is increased, the frequency usage efficiency is improved.

Figure 19:
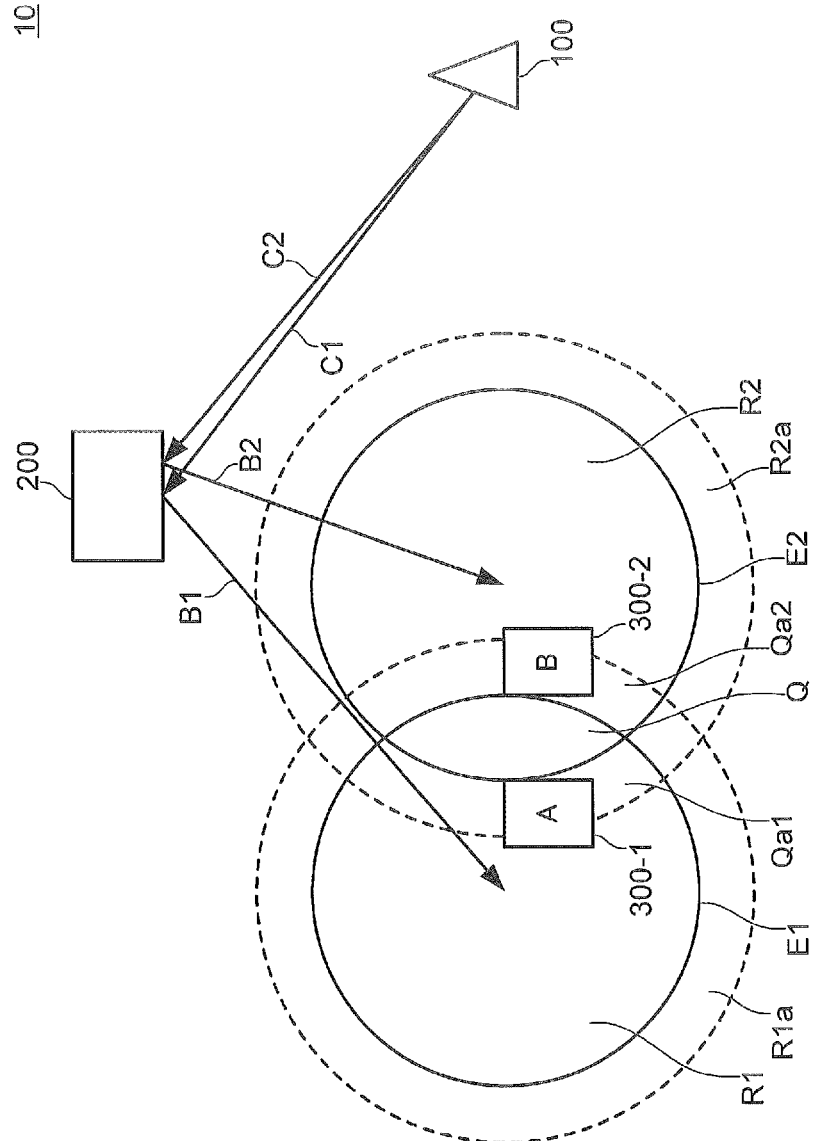
FIG. 19 illustrates another example of the arrangement pattern of receivers in the satellite communication system according to the third modification of the first exemplary embodiment of the present disclosure.

In an example of FIG. 19, airplane A is present in neighborhood area Qa2 and airplane B is present in neighborhood area Qa1. Neighborhood area Qa2 is an area of an overlap region of area R1a (broken line) obtained by slightly extending coverage area R1 and coverage area R2 except for overlap region Q.

Receiver 300-2 of airplane A in neighborhood area Qa2 can receive a signal transmitted by beam B2 with high received power for the signal to be demodulated alone and a signal transmitted by beam B1 with received power too low for the signal to be demodulated alone.

When one airplane is present in each of neighborhood areas Qa1, Qa2 (FIG. 19), scheduler 106 at ground station 100 performs scheduling like the example of FIG. 17.

Receiver 300-1 receives transmission data A(1), A(3) transmitted by beams B1, B2 at times t1, t3, respectively and combines the transmission data. Receiver 300-2 receives transmission data B(2), B(4) from beams B1, B2 at times t2, t4, respectively and combines the transmission data.

As the data are combined, power received by receivers 300-1, 300-2 increases and thus an SN ratio increases accordingly. As the SN ratio is increased, the frequency usage efficiency is improved.

Effects of Third Modification of First Exemplary Embodiment

As described above, in the third modification of the present exemplary embodiment, when some receivers are present in a neighborhood area, time division transmission is performed at the same frequency and the same data is transmitted to all the receivers in the overlap region by multibeam. It is thus possible to improve the SN ratio by combining power in the receivers in the neighborhood area.

Second Exemplary Embodiment

The first exemplary embodiment has described a case where ground station 100 simultaneously transmits the same data via satellite station 200 to receiver 300-2 in overlap region Q at the same frequency by beams B1, B2. Meanwhile, a second exemplary embodiment will describe a case where ground station 100 transmits different data via satellite station 200 to receiver 300-2 in overlap region Q by beams B1, B2 to perform 2×2 multiple input multiple output (MIMO) communication between satellite station 200 and receiver 300-2.

A system configuration of the present exemplary embodiment is the same as those illustrated in FIGS. 6, 12. A configuration of ground station 100 according to the present exemplary embodiment is the same as that illustrated in FIG. 8. A configuration of receiver 300 according to the present exemplary embodiment is the same as that illustrated in FIG. 10. However, receiver 300 includes two receiving antennas Rx for MIMO in the present exemplary embodiment. Transmission antennas 203-1, 203-2 at satellite station 200 function as two transmitting antennas Tx for MIMO transmission in the present exemplary embodiment.

Figure 20:
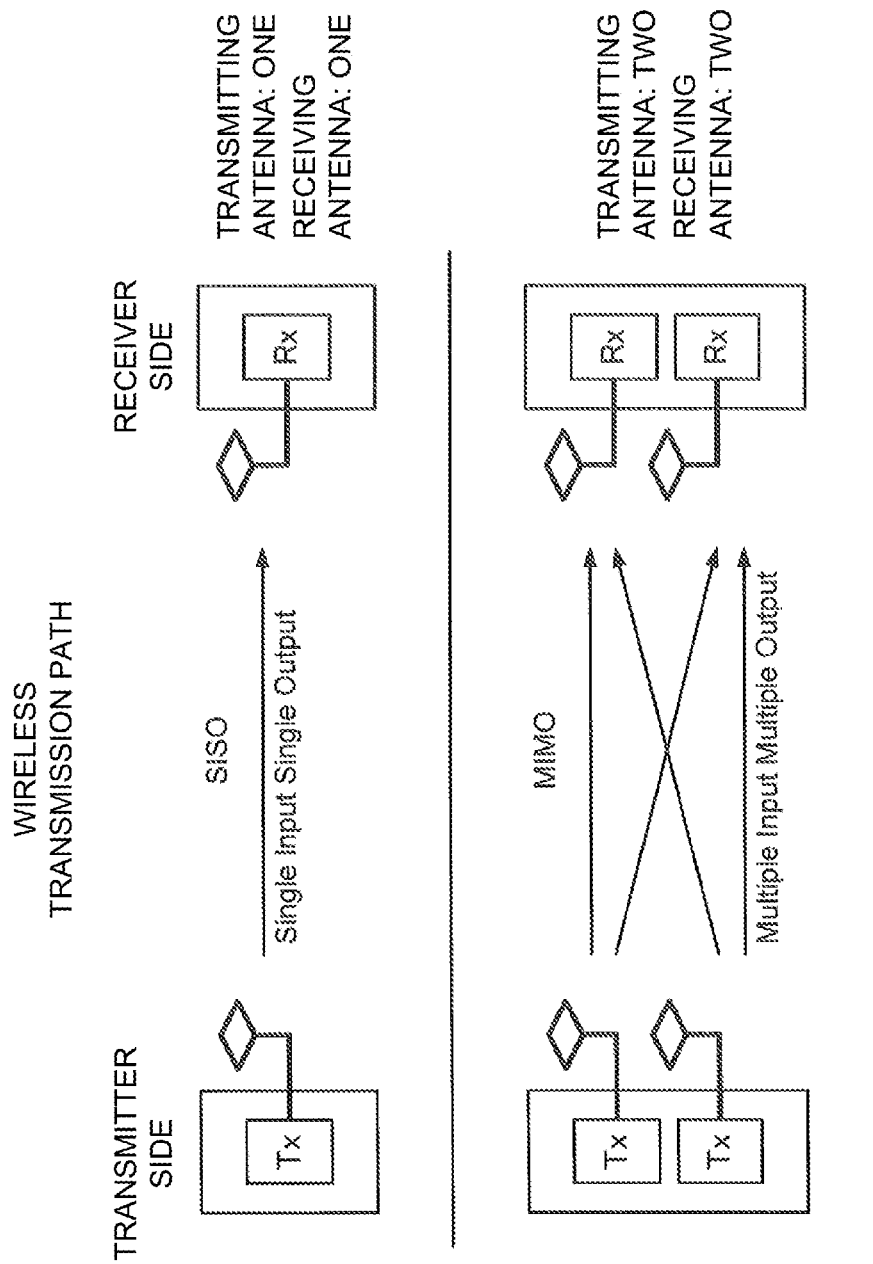
FIG. 20 is a conceptual view of single input single output (SISO) and multiple input multiple output (MIMO).

FIG. 20 is a conceptual view of SISO and MIMO. A conceptual view of single input single output (SISO) is illustrated in an upper portion of FIG. 20, and a conceptual view of 2×2 MIMO is illustrated in a lower portion of FIG. 20. In 2×2 MIMO, a transmitter includes two transmitting antennas Tx and a receiver includes two receiving antennas Rx. The transmitter transmits different data D1, D2 from two transmitting antennas Tx in a same frequency band. The receiver receives mixed signals transmitted from two transmitting antennas Tx by two receiving antennas Rx and performs mathematical processing on the signals to separate data D1, D2. Accordingly, an amount of data transmitted with 2×2 MIMO is twice as large as a case of SISO.

Figure 21:
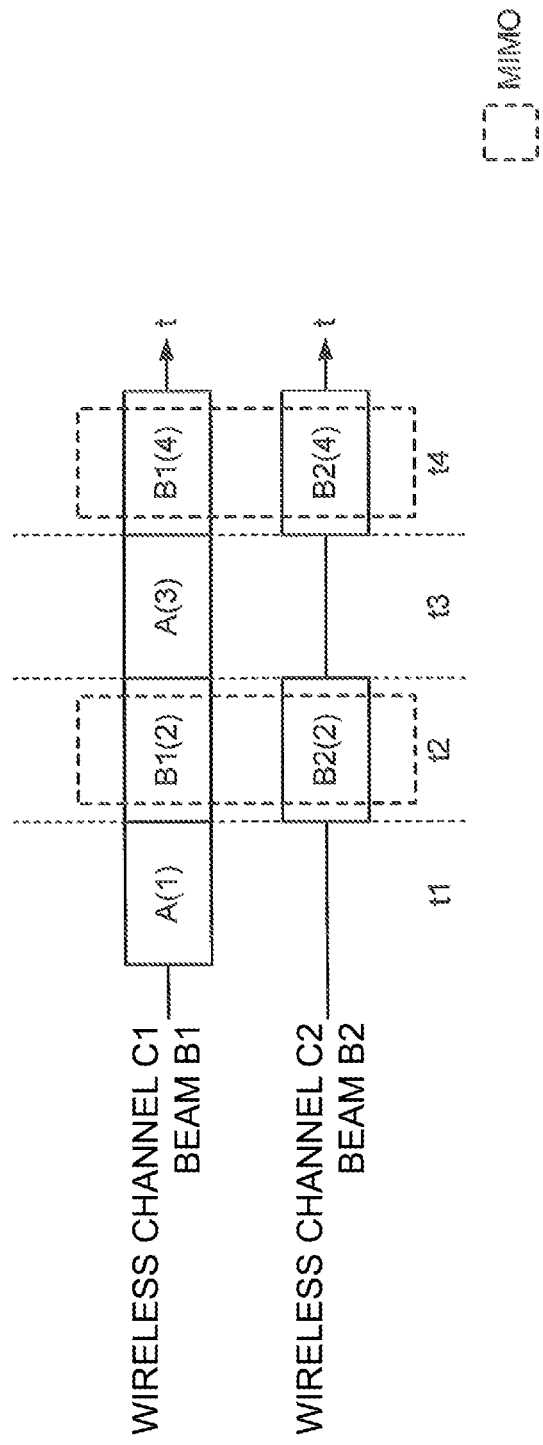
FIG. 21 illustrates an example of scheduling in the case of FIG. 12 in a second exemplary embodiment of the present disclosure.

When one airplane B is present in overlap region Q (FIG. 12), in the present exemplary embodiment, as illustrated in FIG. 21, ground station 100 successively transmits transmission data A(1), B1(2), A(3), B1(4) to satellite station 200 at times t1, t2, t3, t4, respectively by wireless channel C1. In addition, ground station 100 intermittently transmits transmission data B2(2), B2(4) to satellite station 200 at times t2, t4, respectively by wireless channel C2.

As a result, transmission data A(1), B1(2), A(3), B1(4) are successively transmitted from satellite station 200 at times t1, t2, t3, t4, respectively by beam B1. In addition, transmission data B2(2), B4(4) are intermittently transmitted from satellite station 200 at times t2, t4, respectively by beam B2.

Receiver 300-1 receives transmission data A(1), A(3) transmitted by beam B1 at times t1, t3, respectively.

Receiver 300-2 receives transmission data B1(2), B1(4) from beam B1 and transmission data B2(2), B2(4) from beam B2 at times t2, t4, respectively. Receiver 300-2 performs the mathematical processing to separate transmission data B1(2) from transmission data B2(2) at time t2 and transmission data B1(4) from transmission data B2(4) at time t4.

Effects of Second Exemplary Embodiment

A wireless transmission path between satellite station 200 and receiver 300-2 configures 2×2 MIMO in the present exemplary embodiment. Consequently, the amount of transmission data to receiver 300-2 in overlap region Q is twice as large as the case of SISO.

Third Exemplary Embodiment

The second exemplary embodiment has described a case where 2×2 MIMO communication is performed between satellite station 200 and receiver 300-2. Meanwhile, a third exemplary embodiment will describe a case where a plurality of polarized waves are used to transmit different data for different polarized waves by beams B1, B2 and polarization MIMO communication is performed between satellite station 200 and receiver 300-2.

A system configuration of the present exemplary embodiment is the same as those illustrated in FIGS. 6, 12. A configuration of ground station 100 according to the present exemplary embodiment is the same as that illustrated in FIG. 8. However, ground station 100 transmits transmission data by two polarized waves (H-polarized wave, V-polarized wave) in the present exemplary embodiment. A configuration of receiver 300 according to the present exemplary embodiment is the same as that illustrated in FIG. 10. However, receiver 300 transmits transmission data addressed to an own station by two polarized waves (H-polarized wave, V-polarized wave) in the present exemplary embodiment. In addition, transmission data is transmitted by two polarized waves (H-polarized wave, V-polarized wave) in beams B1, B2 from satellite station 200 in the present exemplary embodiment.

Figure 22:
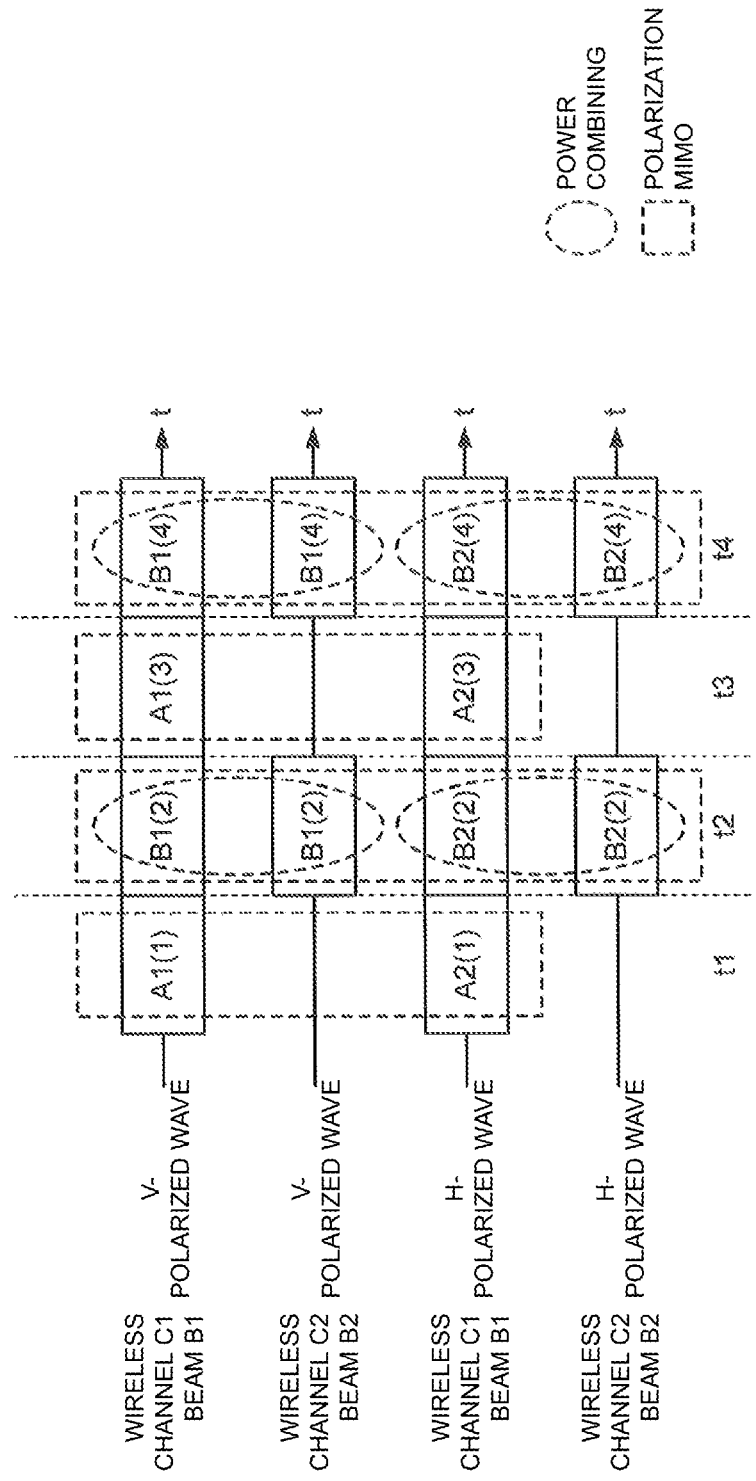
FIG. 22 illustrates an example of scheduling in the case of FIG. 12 in a third exemplary embodiment of the present disclosure.

When one airplane B is present in overlap region Q (FIG. 12), in the present exemplary embodiment, as illustrated in FIG. 22, ground station 100 successively transmits transmission data A(1), B1(2), A1(3), B1(4) to satellite station 200 at times t1, t2, t3, t4, respectively by the V-polarized wave of wireless channel C1. In addition, ground station 100 successively transmits transmission data A2(1), B2(2), A2(3), B2(4) to satellite station 200 at times t1, t2, t3, t4, respectively by the H-polarized wave of wireless channel C1. Moreover, ground station 100 intermittently transmits transmission data B1(2), B1(4) to satellite station 200 at times t2, t4, respectively by the V-polarized wave of wireless channel C2. Ground station 100 intermittently transmits transmission data B2(2), B2(4) to satellite station 200 at times t2, t4, respectively by the H-polarized wave of wireless channel C2.

As a result, transmission data A1(1), B1(2), A1(3), B1(4) are successively transmitted from satellite station 200 at times t1, t2, t3, t4, respectively by the V-polarized wave of beam B1. At the same time, transmission data A2(1), B2(2), A2(3), B2(4) are successively transmitted from satellite station 200 at times t1, t2, t3, t4, respectively by the H-polarized wave of beam B1. Transmission data B1(2), B1(4) are intermittently transmitted from satellite station 200 at times t2, t4, respectively by the V-polarized wave of beam B2. In addition, transmission data B2(2), B2(4) are intermittently transmitted from satellite station 200 at times t2, t4, respectively by the H-polarized wave of beam B2.

Receiver 300-1 receives transmission data A1(1), A1(3) transmitted by the V-polarized wave of beam B1 and transmission data A2(1), A2(3) transmitted by the H-polarized wave of beam B1 at times t1, t3, respectively. Receiver 300-1 performs filtering to separate transmission data A1(1) from transmission data A2(1) at time t2 and transmission data A1(3) from transmission data A2(3) at time t3.

Receiver 300-2 receives transmission data B1(2), B1(4) from the V-polarized waves of beams B1, B2 at times t2, t4, respectively and combines the transmission data. Receiver 300-2 also receives transmission data B2(2), B2(4) from the H-polarized waves of beams B1, B2 at times t2, t4, respectively and combines the transmission data. Receiver 300-2 performs filtering to separate transmission data B1(2) from transmission data B2(2) at time t2 and transmission data B1(4) from transmission data B2(4) at time t4.

Effects of Third Exemplary Embodiment

A wireless transmission path between satellite station 200 and receiver 300-1 thus configures polarization MIMO in the present exemplary embodiment. Consequently, the amount of transmission data to receiver 300-1 outside overlap region Q is twice as large as the case of SISO. In addition, according to the present exemplary embodiment, it is possible to improve an SN ratio by combining reception of beams B1, B2 and increase throughput in receiver 300-2. Moreover, a wireless transmission path between satellite station 200 and receiver 300-2 configures the polarization MIMO, and thus the amount of transmission data to receiver 300-2 in overlap region Q is twice as large as the case of SISO. In the present exemplary embodiment, receivers 300-1, 300-2 do not need to include a plurality of receiving antennas for MIMO and to perform mathematical processing for separating signals.

Fourth Exemplary Embodiment

The third exemplary embodiment has described a case where polarization MIMO is performed to transmit different data for each polarized wave using the plurality of polarized waves in beams B1, B2, and in overlap region Q, power is combined for each polarized wave and the polarization MIMO is performed. A fourth exemplary embodiment will describe a case where the polarization MIMO is performed to transmit different data for each polarized wave using a plurality of polarized waves in beams B1, B2, and in overlap region Q, 4×4 MIMO is performed by beams and polarized waves.

A system configuration of the present exemplary embodiment is the same as those illustrated in FIGS. 6, 12. A configuration of ground station 100 according to the present exemplary embodiment is the same as that illustrated in FIG. 8. However, ground station 100 transmits transmission data by two polarized waves (H-polarized wave, V-polarized wave) in the present exemplary embodiment. A configuration of receiver 300 according to the present exemplary embodiment is the same as that illustrated in FIG. 10. However, receiver 300 includes two receiving antennas Rx for MIMO and receives transmission data addressed to an own station by two polarized waves (H-polarized wave, V-polarized wave) in the present exemplary embodiment. Moreover, transmitting antennas 203-1, 203-2 in satellite station 200 function as two transmitting antennas Tx for MIMO transmission, and transmits transmission data by two polarized waves (H-polarized wave, V-polarized wave) in beams B1, B2 in the present exemplary embodiment.

Figure 23:
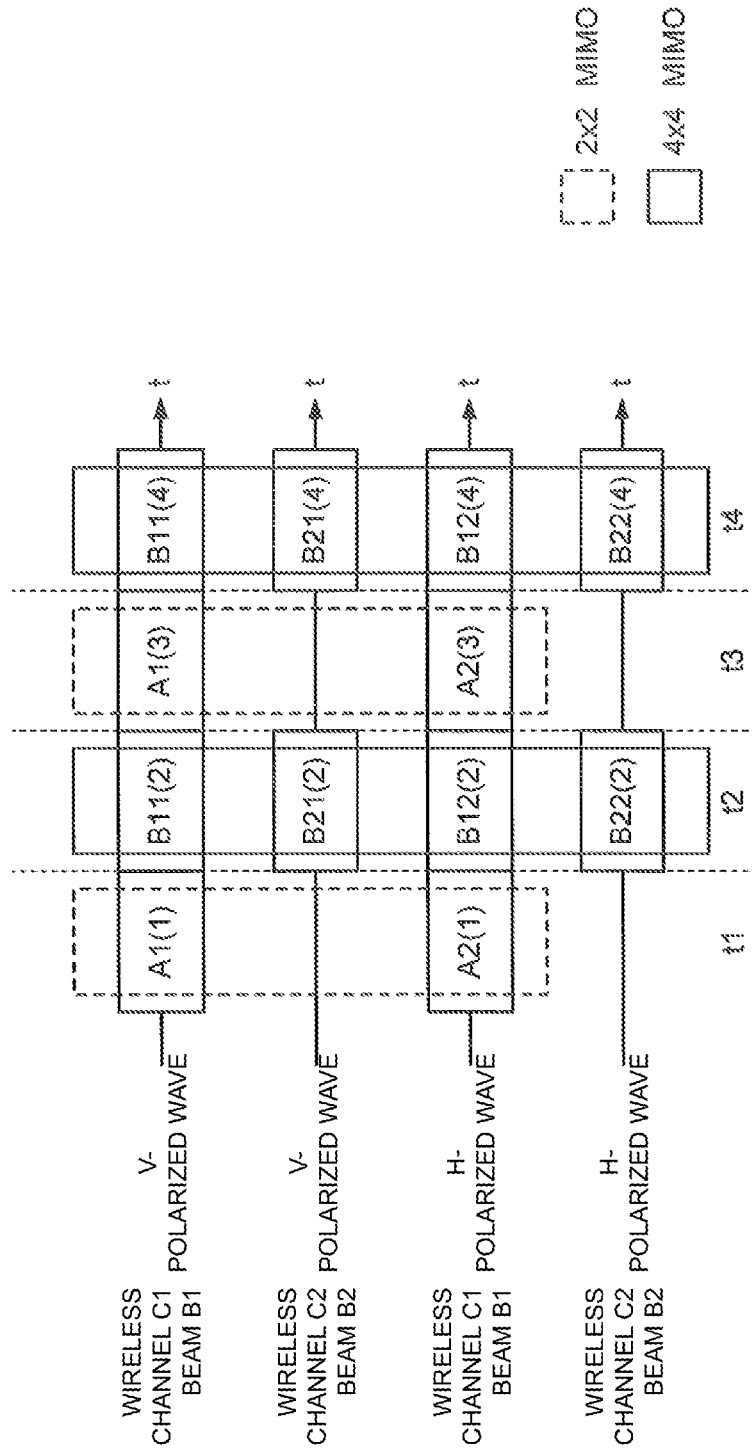
FIG. 23 illustrates an example of scheduling in the case of FIG. 12 in a fourth exemplary embodiment of the present disclosure.

When one airplane B is present in overlap region Q (FIG. 12), in the present exemplary embodiment, as illustrated in FIG. 23, ground station 100 successively transmits transmission data A(1), B11(2), A1(3), B11(4) to satellite station 200 at times t1, t2, t3, t4, respectively by the V-polarized wave of wireless channel C1. In addition, ground station 100 successively transmits transmission data A2(1), B12(2), A2(3), B12(4) to satellite station 200 at times t1, t2, t3, t4, respectively by the H-polarized wave of wireless channel C1. Moreover, ground station 100 intermittently transmits transmission data B21(2), B21(4) to satellite station 200 at times t2, t4, respectively by the V-polarized wave of wireless channel C2. At the same time, ground station 100 intermittently transmits transmission data B22(2), B22(4) to satellite station 200 at times t2, t4, respectively by the H-polarized wave of wireless channel C2.

As a result, transmission data A1(1), B11(2), A1(3), B11(4) are successively transmitted from satellite station 200 at times t1, t2, t3, t4, respectively by the V-polarized wave of beam B1. At the same time, transmission data A2(1), B12(2), A2(3), B12(4) are successively transmitted from satellite station 200 at times t1, t2, t3, t4, respectively by the H-polarized wave of beam B1. Transmission data B21(2), B21(4) are intermittently transmitted from satellite station 200 at times t2, t4, respectively by the V-polarized wave of beam B2. In addition, transmission data B22(2), B22(4) are intermittently transmitted from satellite station 200 at times t2, t4, respectively by the H-polarized wave of beam B2.

Receiver 300-1 receives transmission data A1(1), A1(3) transmitted by the V-polarized wave of beam B1 and transmission data A2(1), A2(3) transmitted by the H-polarized wave of beam B1 at times t1, t3, respectively. Receiver 300-1 performs filtering to separate transmission data A1(1) from transmission data A2(1) at time t2 and transmission data A1(3) from transmission data A2(3) at time t3.

Receiver 300-2 receives transmission data B11(2), B11(4) from the V-polarized wave of beam B1, transmission data B21(2), B21(4) from the V-polarized wave of beam B2, transmission data B12(2), B12(4) from the V-polarized wave of beam B2, and transmission data B22(2), B22(4) from the V-polarized wave of beam B2 at times t2, t4, respectively. Receiver 300-2 performs filtering to separate transmission data B11(2), B21(2), B12(2), and B22(2) from each other at time t2 and transmission data B11(4), B21(4), B12(4), and B22(4) from each other at time t4.

Effects of Fourth Exemplary Embodiment

A wireless transmission path between satellite station 200 and receiver 300-1 thus configures polarization MIMO in the present exemplary embodiment. Consequently, the amount of transmission data to receiver 300-1 outside overlap region Q is twice as large as the case of SISO. A wireless transmission path between satellite station 200 and receiver 300-2 configures 4×4 MIMO in the present exemplary embodiment. Consequently, the amount of transmission data to receiver 300-2 in overlap region Q is four times as large as the case of SISO.

Summaries of First to Fourth Exemplary Embodiments

The following is a table of a number of streams and frequency usage efficiency in the first to fourth t exemplary embodiments and a conventional technique.

TABLE 1

| Configuration | | Conventional technique | First exemplary embodiment | Second exemplary embodiment | Third exemplary embodiment | Fourth exemplary embodiment |
|---|---|---|---|---|---|---|
| Number of streams | Inside overlap region | 1 | 1 | 2 | 2 | 4 |
| | Outside overlap region | 1 | 1 | 1 | 2 | 2 |
| Frequency usage efficiency as compared to conventional technique | Inside overlap region | — | Approximately 1.3 times (C/N improved by 3 dB) | Twice (2 × 2 MIMO) | Approximately 2.6 times (C/N improved by 3 dB + 2 × 2 MIMO) | Four times (4 × 4 MIMO) |
| | Outside overlap region | — | Once | Once | Twice (2 × 2 MIMO) | Twice (2 × 2 MIMO) |

Fifth Exemplary Embodiment

A fifth exemplary embodiment will describe a case where an airplane is present in each of area R1, overlap region Q, and area R2.

Figure 24:
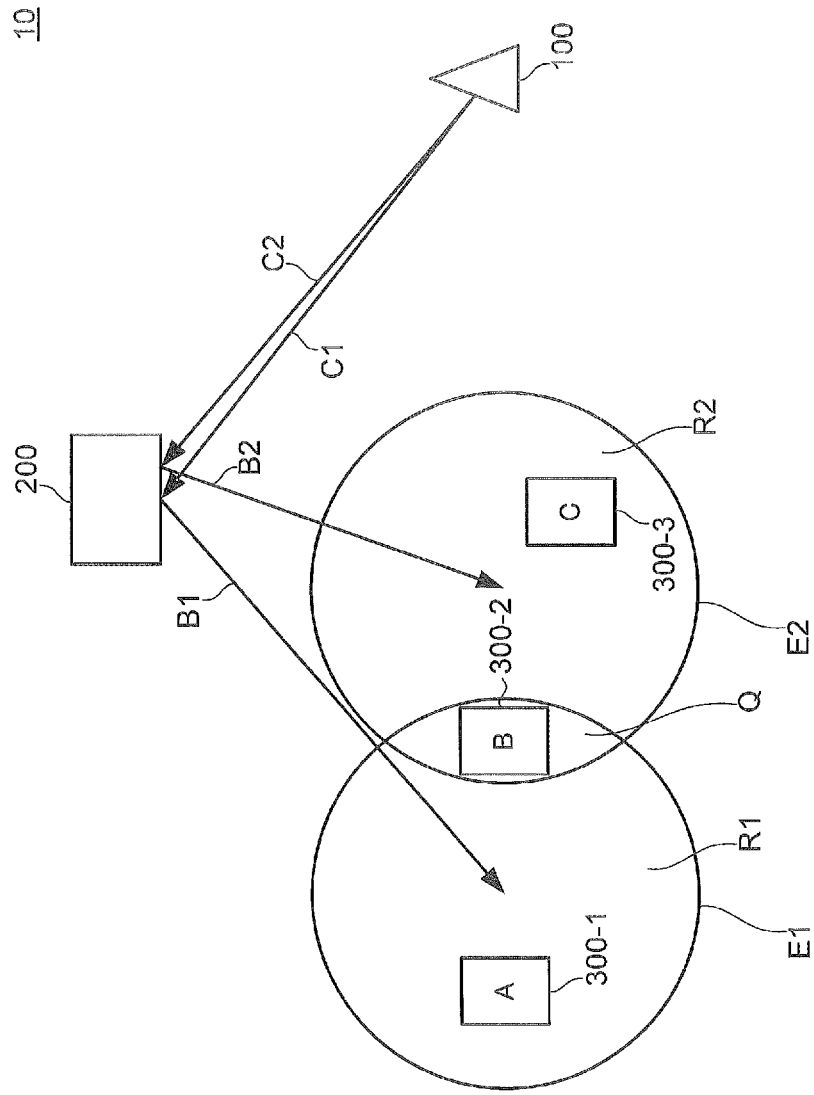
FIG. 24 illustrates an example of an arrangement pattern of receivers in a satellite communication system according to a fifth exemplary embodiment of the present disclosure.

In an example of FIG. 24, airplane A having receiver 300-1 mounted thereon is present in area R1, airplane B having receiver 300-2 mounted thereon is present in overlap region Q, and airplane C having receiver 300-3 mounted thereon is present in area R2.

Figure 25:
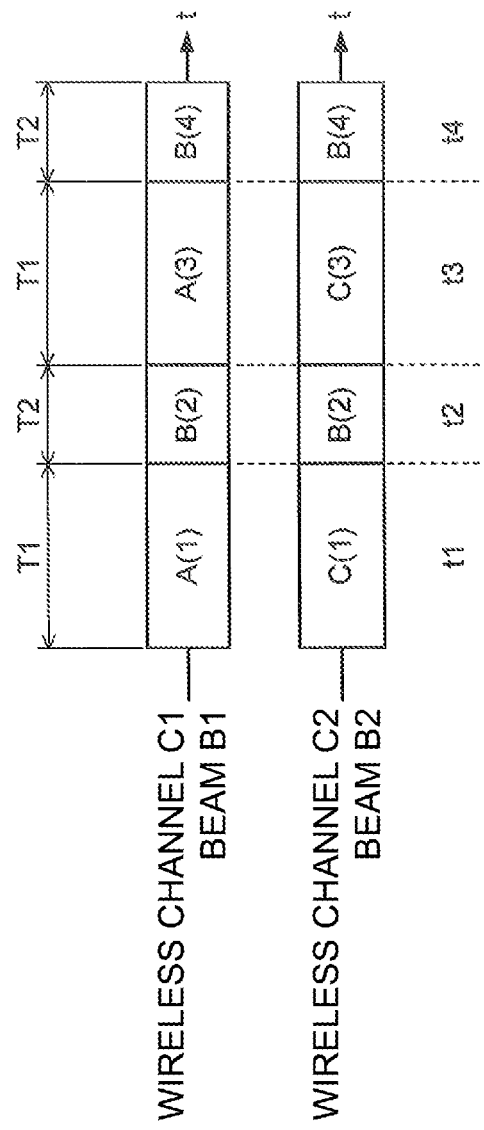
FIG. 25 illustrates an example of scheduling in a case of FIG. 24 in the fifth exemplary embodiment of the present disclosure.

In this case, to prevent interference, scheduler 106 performs scheduling to perform time division transmission in receiver 300-1 or receiver 300-3 and receiver 300-2 and perform multichannel transmission in receiver 300-2 in overlap region Q, as illustrated in FIG. 25. No interference occurs between receiver 300-1 and receiver 300-3, and thus scheduling is performed to perform space division transmission in receiver 300-1 and receiver 300-3 at the same time.

In the example of FIG. 25, ground station 100 successively transmits transmission data A(1), B(2), A(3), B(4) to satellite station 200 at times t1, t2, t3, t4, respectively by wireless channel C1. At the same time, ground station 100 successively transmits transmission data C(1), B(2), C(3), B(4) to satellite station 200 at times t1, t2, t3, t4, respectively by wireless channel C2.

As a result, transmission data A(1), B(2), A(3), B(4) are successively transmitted from satellite station 200 at times t1, t2, t3, t4, respectively by beam B1. At the same time, transmission data C(1), B(2), C(3), B(4) are successively transmitted from satellite station 200 at times t1, t2, t3, t4, respectively by beam B2.

Receiver 300-1 receives transmission data A(1), A(3) transmitted by beam B1 at times t1, t3, respectively. Receiver 300-2 receives transmission data B(2), B(4) from beams B1, B2 at times t2, t4, respectively and combines the transmission data. Receiver 300-3 receives transmission data C(1), C(3) transmitted by beam B2 at times t1, t3, respectively.

Effects of Fifth Exemplary Embodiment

As described above, the same data is transmitted to receiver 300-2 in overlap region Q by beams B1, B2, in the present exemplary embodiment. Data is transmitted to receiver 300-1 in area R1 by beam B1 and the same time, data is transmitted to receiver 300-3 in area R2 by beam B2. As power is combined, an SN ratio is improved. In addition, resources of a wireless transmission path can be used without any waste.

In the second to fourth exemplary embodiments, when airplane C is present in area R2, transmission data A can be transmitted to receiver 300-1 by beam B1 and at the same time transmission data C can be transmitted to receiver 300-3 by beam B2.

The first to fifth exemplary embodiments of the present disclosure have been described above.

The present disclosure can be achieved by software, hardware, or software in cooperation with hardware. Each functional block used in the description of the above exemplary embodiments can be partly or entirely achieved by a large-scale integration (LSI) such as an integrated circuit, and each process described in the exemplary embodiments may be controlled partly or entirely by the same LSI or a combination of LSIs. The LSI may be formed as individual chips, or one chip may be formed so as to include a part or all of the functional blocks. The LSI may include a data input and output coupled thereto. The LSI here may be referred to as an integrated circuit (IC), a system LSI, a super LSI, or an ultra LSI depending on a difference in the degree of integration. The technique of implementing an integrated circuit is not limited to the LSI and may be achieved by means of a dedicated circuit, a general-purpose processor, or a special-purpose processor. In addition, it is possible to use a field programmable gate array (FPGA) that can be programmed after manufacturing the LSI or a reconfigurable processor in which connections and settings of circuit cells in the LSI can be reconfigured. The present disclosure can be achieved as digital processing or analogue processing. Further, when there emerges a technique for circuit integration that replaces the LSI as a result of the advancement of semiconductor technology or other derivative technology, the function blocks may be integrated by using that technique. Biotechnology can also be applied.

A transmitter according to the present disclosure is a transmitter that communicates with at least one receiver via a satellite station that transmits a signal by a multibeam system. The transmitter includes a scheduler and a transmission unit. The scheduler performs scheduling to determine a time and a wireless channel to transmit data addressed to the receiver based on an area where the at least one receiver is present. The transmission unit transmits a signal of the data addressed to the receiver to the satellite station by the wireless channel determined by the scheduler at the time determined by the scheduler. A signal having been transmitted from the transmission unit by an i-th (i is an integer of 1 or larger) wireless channel is transmitted from the satellite station to the receiver by an i-th beam. Frequencies of signals transmitted from the satellite station by respective beams are same.

According to the transmitter of the present disclosure, the scheduler may perform scheduling to transmit data addressed to the at least one receiver in a specified area including an overlap region of a first coverage area of a first beam and a second coverage area of a second beam by a first wireless channel and a second wireless channel at a same time.

According to the transmitter of the present disclosure, the transmission unit may transmit same data to the at least one receiver in the specified area by the first wireless channel and the second wireless channel at the same time.

According to the transmitter of the present disclosure, the transmission unit may transmit different data to the at least one receiver in the specified area by the first wireless channel and the second wireless channel at the same time so as to be separated from each other in the at least one receiver.

According to the transmitter of the present disclosure, the transmission unit may transmit different data by different polarized waves using the first wireless channel and the second wireless channel.

The at least one receiver may include a first receiver and a second receiver. According to the transmitter of the present disclosure, when the first receiver is present in an area of the first coverage area or the second coverage area except for the specified area and the second receiver is present in the specified area, the scheduler may perform scheduling to transmit first data addressed to the first receiver and second data addressed to the second receiver in time division.

According to the transmitter of the present disclosure, the scheduler may perform scheduling so as to cause a first transmission time of the first data to be different from a second transmission time of the second data.

According to the transmitter of the present disclosure, the scheduler may perform scheduling so as to cause the second transmission time to be shorter than the first transmission time.

According to the transmitter of the present disclosure, when the first receiver is present in an area of the first coverage area except for the specified area and the second receiver is present in an area of the second coverage area except for the specified area, the scheduler may perform scheduling to successively transmit the first data by the first wireless channel and the second data by the second wireless channel.

According to the transmitter of the present disclosure, when the first receiver and the second receiver are present in the specified area, the scheduler may perform scheduling to transmit the first data and the second data in time division and transmit the first data and the second data by the first wireless channel and by the second wireless channel.

In a transmission method according to the present disclosure, a transmitter transmits data via a satellite station that transmits a signal by a multibeam system to a receiver. Frequencies of signals transmitted from the satellite station by respective beams are same. The transmission method includes the transmitter determining a time and a wireless channel to transmit data addressed to the receiver based on an area where the receiver is present. The transmission method also includes the transmitter transmitting a signal of the data addressed to the receiver to the satellite station by the wireless channel determined at the time determined. The transmission method also includes the satellite station relaying a signal having been transmitted from the ground station by an i-th is an integer of 1 or larger) wireless channel to transmit the signal to the receiver by an i-th beam.

INDUSTRIAL APPLICABILITY

One aspect of the present disclosure is useful for a satellite communication system.

REFERENCE MARKS IN THE DRAWINGS 1, 2: base station
10: satellite communication system
100: ground station (transmitter)
101-A, 101-B: coding unit
102-A, 102-B: modulator
103-A, 103-B: buffer
104: memory
105: position specifier
106: scheduler
107: channel selector
108-1, 108-2: wireless transmission unit
109, 301: antenna
111: transmission unit
200: satellite station
201-1, 201-2: receiving antenna
202-1, 202-2: transponder
203-1, 203-2: transmitting antenna
221-1, 221-2, 224-1, 224-2: bandpass filter
222-1, 222-2, 225-1, 225-2: amplifier
223-1, 223-2: frequency converter
3, 300, 300-1, 300-2: receiver
302: wireless receiver
303: controller
304: extractor
305: demodulator
306: decoder
B1, B2, B3, B4: beam
C1, C2: wireless channel
E1, E2, E3, E4: coverage area
Q: overlap region
Qa1, Qa2: neighborhood area
R1, R2: area (area, coverage area except for overlap region)
R1a, R2a: area
Rx: receiving antenna
Tx: transmitting antenna

The invention claimed is:

1. A transmission device that communicates with at least one receiver via a satellite station that transmits a signal by a multibeam system, the transmission device comprising:
a position specifier that specifies a position of the at least one receiver, the position changing over time;
a scheduler that (i) determines an area where the at least one receiver is present based on the position of the at least one receiver and coverage areas of beams from the satellite station and (ii) performs scheduling to determine a time and a wireless channel to transmit data addressed to the at least one receiver based on the area where the at least one receiver is present; and a transmitter that transmits a signal of the data addressed to the at least one receiver to the satellite station by the wireless channel determined by the scheduler and at the time determined by the scheduler, wherein:

the signal transmitted from the transmitter by an i-th wireless channel is transmitted from the satellite station to the at least one receiver by an i-th beam, wherein i represents an integer of 1 or larger, frequencies of signals transmitted from the satellite station by respective beams are same, the scheduler performs scheduling to transmit the data addressed to the at least one receiver in a specified area being an overlap region of a first coverage area of a first beam and a second coverage area of a second beam by a first wireless channel and a second wireless channel at a same time, the at least one receiver includes a first receiver and a second receiver, and when the first receiver is present in an area of the first coverage area or the second coverage area other than the specified area and the second receiver is present in the specified area, the scheduler performs scheduling to transmit first data addressed to the first receiver and second data addressed to the second receiver in time division in which the first data addressed to the first receiver and the second data addressed to the second receiver are transmitted non-concurrently.

2. The transmission device according to claim 1, wherein the transmitter transmits same data to the at least one receiver in the specified area by the first wireless channel and the second wireless channel at the same time.

3. The transmission device according to claim 1, wherein the transmitter transmits different data to the at least one receiver in the specified area by the first wireless channel and the second wireless channel at the same time so as to be separated from each other in the at least one receiver.

4. The transmission device according to claim 3, wherein the transmitter transmits different data by different polarized waves using the first wireless channel and the second wireless channel.

5. The transmission device according to claim 1, wherein the scheduler performs scheduling so as to cause a length of a first transmission time of the first data to be different from a length of a second transmission time of the second data.

6. The transmission device according to claim 5, wherein the scheduler performs scheduling so as to cause the second transmission time to be shorter than the first transmission time.

7. The transmission device according to claim 1, wherein when the first receiver is present in an area of the first coverage area other than the specified area and the second receiver is present in an area of the second coverage area other than the specified area, the scheduler performs scheduling to successively transmit the first data by the first wireless channel and to successively transmit the second data by the second wireless channel.

8. The transmission device according to claim 1, wherein when the first receiver and the second receiver are present in the specified area, the scheduler performs scheduling to transmit the first data and the second data in time division and to transmit the first data and the second data by the first wireless channel and by the second wireless channel.

9. The transmitter according to claim 1, wherein the position specifier specifies the position of the at least one receiver based on an operation plan for the at least one receiver.

10. The transmitter according to claim 1, wherein the position specifier specifies the position of the at least one receiver based on position information of the at least one receiver obtained from the at least one receiver.

11. A transmission method for a transmitter to transmit data via a satellite station that transmits a signal by a multibeam system to at least one receiver, wherein frequencies of signals transmitted from the satellite station by respective beams are same, and wherein the transmission method comprises:

specifying, by the transmitter, a position of the at least one receiver, the position changing over time;

determining, by the transmitter, an area where the at least one receiver is present based on the position of the at least one receiver and coverage areas of beams from the satellite station:

determining, by the transmitter, a time and a wireless channel to transmit data addressed to the at least one receiver based on the area where the at least one receiver is present;

transmitting, by the transmitter, a signal of the data addressed to the at least one receiver to the satellite station by the wireless channel determined and at the time determined; and relaying, by the satellite station, the signal transmitted from the transmitter by an i-th wireless channel and transmitting, by the satellite station, the signal to the at least one receiver by an i-th beam, wherein i represents an integer of 1 or larger, wherein:

the determining includes determining the time and the wireless channel to transmit the data addressed to the at least one receiver in a specified area being an overlap region of a first coverage area of a first beam and a second coverage area of a second beam by a first wireless channel and a second wireless channel at a same time, the at least one receiver includes a first receiver and a second receiver, and the determining includes determining, when the first receiver is present in an area of the first coverage area or the second coverage area other than the specified area and the second receiver is present in the specified area, the time and the wireless channel to transmit first data addressed to the first receiver and second data addressed to the second receiver in time division in which the first data addressed to the first receiver and the second data addressed to the second receiver are transmitted non-concurrently.

* * * * *